United States Patent
Iwami et al.

(10) Patent No.: US 8,657,140 B2
(45) Date of Patent: Feb. 25, 2014

(54) FILLER CAP FOR FUEL TANK

(76) Inventors: Masashi Iwami, Ota (JP); Masao Iwami, Ota (JP)

(*) Notice: Subject to any disclaimer, the term of this patent is extended or adjusted under 35 U.S.C. 154(b) by 0 days.

(21) Appl. No.: 13/548,686

(22) Filed: Jul. 13, 2012

(65) Prior Publication Data
US 2013/0075396 A1 Mar. 28, 2013

(30) Foreign Application Priority Data

Sep. 25, 2011 (JP) ................................. 2011-208325
Dec. 2, 2011 (JP) ................................. 2011-264403

(51) Int. Cl.
*B65D 51/16* (2006.01)
(52) U.S. Cl.
USPC ............ 220/203.28; 220/203.01; 220/203.11; 220/203.16; 220/203.18; 220/203.29; 220/367.1
(58) Field of Classification Search
USPC .................. 220/202, 203.01, 203.11, 203.16, 220/203.18, 203.28, 203.29, 367.1, 371, 220/373, 745, 746, 747, DIG. 33
See application file for complete search history.

(56) References Cited

U.S. PATENT DOCUMENTS

| 4,922,954 A * | 5/1990 | Blomquist et al. ............. 137/493 |
| 5,148,934 A * | 9/1992 | Kasugai et al. .......... 220/203.25 |
| 6,866,056 B1 * | 3/2005 | Scott ........................... 137/15.18 |
| 7,578,405 B2 * | 8/2009 | Hagano ..................... 220/203.23 |
| 7,654,403 B2 * | 2/2010 | DeCapua et al. ........ 220/203.23 |
| 7,823,611 B2 | 11/2010 | Iwami et al. |
| 8,353,418 B2 * | 1/2013 | Bork ........................ 220/203.26 |

FOREIGN PATENT DOCUMENTS

| JP | A-5-133287 | 5/1993 |
| JP | A-6-219461 | 8/1994 |
| JP | A-2008-7095 | 1/2008 |
| JP | A-2010-64593 | 3/2010 |

* cited by examiner

*Primary Examiner* — Anthony Stashick
*Assistant Examiner* — Madison L Poos
(74) *Attorney, Agent, or Firm* — Oliff PLC

(57) ABSTRACT

A filler cap for a fuel tank wherein, when a pressure increases in the fuel tank, the valve body moves upward so an upper peripheral edge part of the valve body may be contacted to a first surface of shoulder cylinder portion, thereby shutting down a connection between a second space of cylinder main body and a third space connected to atmosphere. When the pressure in the fuel tank exceeds a pressure for a deformation strength of the valve body, a central part of the valve body enters into the third space causing deformation to shorten the outer diameter thereof; in the peripheral part of the valve body a concave portion not contacted to a lower end of a third surface that forms the third space, and the second space and the third space are connected via a space of this concave portion to release excessive pressure.

2 Claims, 12 Drawing Sheets

Fig. 17
(M)
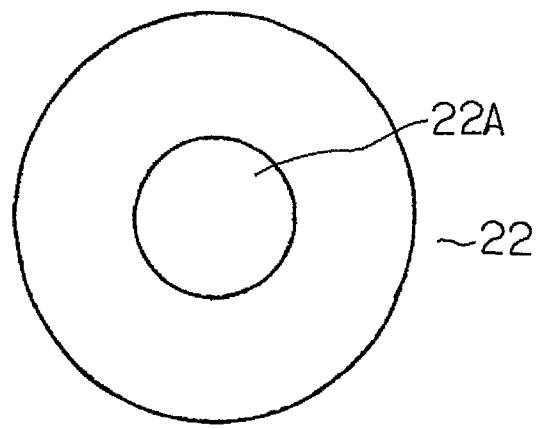
(N)
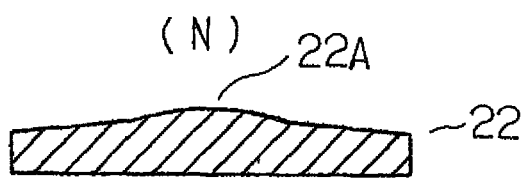
(O)
(P)

FILLER CAP FOR FUEL TANK

BACKGROUND OF THE INVENTION

1. Field of the Invention

The present invention relates to a filler cap for a fuel tank to seal a filler opening arranged to an automobile and so on.

2. Description of the Related Art

In the past, in a filler cap for a fuel tank of an internal-combustion engine arranged to an automobile and so on (such as an automobile, an agricultural machinery, a power generator, a lawn mower, a motor cycle, a boat and a ship, a construction machine, and a roadwork machine), there has been arranged an air passage channel to inhale an atmospheric air because it is necessary to inhale an atmospheric air the amount of which is in proportion to the volume of a fuel consumed in the fuel tank.

Accordingly, a vaporized gas generated from the fuel in the fuel tank is discharged into an atmosphere through the air passage channel arranged to the filler cap, thereby causing a problem of an environmental pollution. In addition, if the fuel tank arranged to an automobile and so on is tilted more than a prescribed angle, there has been a risk that the fuel leaks out through the air passage channel so that the fuel may catch fire.

In view of the foregoing, there has been proposed a technology to prevent large amount of the fuel in the fuel tank from leaking out through the air passage channel (see, Japanese Patent Laid-Open Publication No. H06-219461). That is, in this technology, a concavoconvex portion to form a winding passage channel that constitutes a part of the air passage channel is arranged in a gap between an outer cap and a receiving part of an inner cap in the filler cap described above; and, through this winding passage channel, only a harmful gas evaporated from the fuel in the fuel tank is discharged to outside the filler cap, while preventing a large amount of the fuel from leaking to outside by the concavoconvex portion.

In addition, to prevent the fuel in the fuel tank from leaking out through the air passage channel, a technology that a valve such as a ball valve and a float valve is arrange in the air passage channel is also conceivable.

Further, a technology by which a harmful gas evaporated from the fuel in the fuel tank is prevented from being discharged to an atmosphere has been proposed (see, Japanese Patent Laid-Open Publication No. H05-133287). That is, in this technology, a harmful gas evaporated from the fuel in the fuel tank is adsorbed onto an adsorbent member (activated carbon) arranged in a canister. Then, a harmful gas adsorbed onto the adsorbent member is desorbed, and then the harmful gas desorbed is inhaled through an induction pipe of an engine for burning; with this, the harmful gas evaporated from the fuel in the fuel tank was prevented from being discharged to an atmosphere through the air passage channel in the filler cap.

SUMMARY OF THE INVENTION

However, in the technology according to Japanese Patent Laid-Open Publication No. H06-219461, a harmful gas evaporated from the fuel in the fuel tank is discharged to outside the filler cap through this winding passage channel; and thus, this was not desirable from an environmental view point. In the technology wherein a valve such as the ball valve and the float valve is arranged in the air passage channel, the air passage channel is always in the state of being openly connected to an atmosphere, thereby discharging the harmful gas to outside the filler cap; and thus, this technology is not only environmentally undesirable but also unpractical because it is structurally complicated and expensive.

In the technology according to Japanese Patent Laid-Open Publication No. H05-133287 mentioned before, wherein a harmful gas evaporated from the fuel in the fuel tank is adsorbed onto an adsorbent member in the canister, a valve mechanism (such as a rolling valve) to prevent the fuel from running into the canister when the fuel tank is tilted or vibrated is necessary; as a consequence, this technology is complicated in structure and expensive in its production, and thus is not practical.

In view of the above, the present invention has an object to provide a practical filler cap for a fuel tank, wherein the cap is capable of preventing the fuel from leaking out through the air passage channel in the filler cap even when the fuel tank is tilted to a prescribed angle, and at the same time, capable of preventing environmental pollution and improving fuel consumption without discharging a harmful gas evaporated from the fuel to the outside, while the structure thereof is simple and thus can be produced cheaply.

Accordingly, an aspect of the first invention provides a filler cap for a fuel tank, wherein the filler cap is attached to a filler opening of a fuel tank, and arranged with an air passage channel to connect between inside and outside the fuel tank in a cap main body comprised of an outer cap and an inner cap and with a valve mechanism portion in this air passage channel; wherein, the valve mechanism portion comprises:

a cylinder main body arranged with a first space of a columnar shape arranged almost at a center position of an inner plane of the inner cap so as to be connected to inside the fuel tank, a second space of a columnar shape having a smaller diameter than the first space and arranged so as to be connected to the first space, and a third space arranged so as to be connected to this second space and at the same time to outside the fuel tank, a valve-body-supporting member arranged in the first space with a large diameter portion so as to form a connection channel to inside the fuel tank and with a small diameter portion having a smaller outer diameter than the large diameter portion and arranged on an upper plane of the small diameter portion with an air passage channel connected to this connection channel, and a valve body formed of a non-air-permeable, elastic material having a thin form with elasticity and flexibility, and also having a circular plain view with a larger diameter than the small diameter portion of the valve-body-supporting member, wherein the valve body is put on the small diameter portion with a peripheral edge part of the valve body being slightly apart from a first surface that is slanted upward so as to connect between a second surface to form the second space of the cylinder main body and a third surface to form the third space, and at the same time, a central part of the valve body under the state of putting on in a manner as mentioned above is facing to the third space; wherein, when a pressure inside the fuel tank is increased by a vaporized gas evaporated from a fuel in the fuel tank, the valve body moves upward by the vaporized gas via the air passage channel and the connection channel between inside the fuel tank and the valve-body-supporting member so that a peripheral part of the valve body may contact to the first surface of the cylinder main body thereby shutting down the connection between the second space and the third space, when the pressure inside the fuel tank is further increased above a pressure for a deformation strength prescribed to the valve body, a central part of the valve body moves upward further and enters into the third space thereby causing deformation so as to shorten the outer diameter of the valve body to form wrinkles; and as a result, in the peripheral part of the valve body are formed a portion contacting to a lower end of the third surface to form the third space of the cylinder main body and a concave portion not contacting thereto, and consequently, the second space and the third space are connected via a space of this concave portion to release an excessive pressure to outside the fuel tank thereby bringing the pressure inside the fuel tank to lower than the pressure for the deformation strength, and when the pressure inside the fuel tank becomes negative by consumption of the fuel inside the fuel tank under the state that a fluid pressure of the fuel is acting to the valve body, the peripheral part of the valve body is sucked toward the fuel tank by this negative pressure whereby the peripheral part of the valve body hangs down by using an upper peripheral edge part of the small diameter portion of the valve-body-supporting member as a pivot point thereby enlarging a gap between the first surface of the cylinder main body and the valve body so as to connect between the second space and the third space thereby introducing an atmospheric air into the fuel tank so as to bring the state of an atmospheric pressure;

whereby functioning as a safety valve as well as a one-way valve.

An aspect of the second invention provides a filler cap for a fuel tank, wherein the filler cap is attached to a filler opening of a fuel tank, and arranged with an air passage channel to connect between inside and outside the fuel tank in a cap main body comprised of an outer cap and an inner cap and with a valve mechanism portion in this air passage channel; wherein, the valve mechanism portion comprises:

a cylinder main body arranged with a first space of a columnar shape arranged almost at a center position of an inner plane of the inner cap so as to be connected to inside the fuel tank, a second space of a columnar shape having a smaller diameter than the first space and arranged so as to be connected to the first space, and a third space arranged so as to be connected to this second space and at the same time to outside the fuel tank, a valve-body-supporting member arranged in the first space with a large diameter portion so as to form a connection channel to inside the fuel tank and with a small diameter portion having a smaller outer diameter than the large diameter portion and arranged on an upper plane of the small diameter portion with an air passage channel connected to this connection channel, and a valve body formed of a non-air-permeable, elastic material having a thin form with elasticity and flexibility, and also having a circular plain view with a larger diameter than the small diameter portion of the valve-body-supporting member, wherein the valve body is put on the small diameter portion under the state that a peripheral edge part of the valve body is contacted to a first surface that is slanted upward so as to connect between a second surface to form the second space of the cylinder main body and a third surface to form the third space thereby blocking the connection between the second space and the third space, and at the same time, a central part of the valve body under the state of putting on in a manner as mentioned above is facing to the third space; wherein, when a pressure inside the fuel tank is increased above a pressure for a deformation strength prescribed to the valve body, a central part of the valve body moves upward and enters into the third space thereby causing deformation so as to shorten the outer diameter of the valve body to form wrinkles; and as a result, in a peripheral part of the valve body are formed a portion contacting to a lower end of the third surface to form the third space of the cylinder main body and a concave portion not contacting thereto, and consequently, the second space and the third space are connected via a space of this concave portion to release an excessive pressure to outside the fuel tank thereby bringing the pressure inside the fuel tank to lower than the pressure for the deformation strength, and when the pressure inside the fuel tank becomes negative by consumption of the fuel inside the fuel tank, the peripheral part of the valve body is sucked toward the fuel tank by this negative pressure whereby the peripheral part of the valve body hangs down by using an upper peripheral edge part of the small diameter portion of the valve-body-supporting member as a pivot point thereby forming a gap between the first surface of the cylinder main body and the valve body so as to connect between the second space and the third space thereby introducing an atmospheric air into the fuel tank so as to become the state of an atmospheric pressure;

whereby functioning as a safety valve as well as a one-way valve.

According to the present invention, provided is a practical filler cap for a fuel tank capable of preventing the fuel from leaking out through the air passage channel in the filler cap even when the fuel tank is tilted to a prescribed angle, and at the same time, capable of preventing environmental pollution and improving fuel consumption without discharging a harmful gas evaporated from the fuel to the outside, because the connection between the second space and the third space (this is connected to an atmospheric air) is shut down until a pressure inside the fuel tank reaches above a pressure for a deformation strength prescribed to the valve body; and consequently, the structure of the filler cap can be made simple and thus can be produced cheaply.

BRIEF DESCRIPTION OF THE DRAWINGS

FIG. 17 shows a plain view of the valve body in the second embodiment (M), and similarly, a vertical cross section view going through a center of the valve body in the second embodiment (N), a vertical cross section view going through a center of the valve body in the second embodiment (N), a vertical cross section view going through a center of the valve body in the third embodiment (O), and a vertical cross section view going through a center of the valve body in the fourth embodiment (P);

DESCRIPTION OF SYMBOLS

Filler cap
Outer cap
Inner cap
Cylinder main body
Large-diameter cylinder portion
Medium-diameter cylinder portion
18B Surface
18S Gap
Shoulder cylinder portion
19A, 19B Surface
19C Pivot point
19D Wall
Small-diameter cylinder portion
Valve body
Valve-body-supporting member
23B Small diameter portion
24, 25 Air passage channel
98 Filler opening
100 Fuel tank
S2 Second space
S3 Third space

DESCRIPTION OF THE PREFERRED EMBODIMENT

Figure 1:
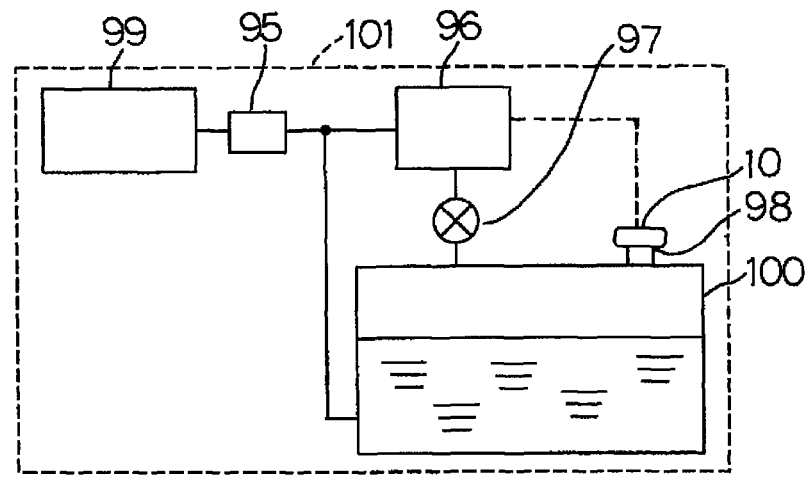
FIG. 1 is a schematic diagram of an automobile applied with the filler cap for a fuel tank of the present invention.

Hereinbelow, an embodiment of the present invention will be explained with referring to the Figures. Firstly, as shown in FIG. 1, filler cap 10 of fuel tank 100 in the present embodiment is mounted on an automobile, an agricultural machinery, a power generator, a lawn mower, a motor cycle, a boat and a ship, a construction machine, a roadwork machine, and so on (hereinafter, referred to as "automobile 101" as a whole), wherein the filler cap plays a role to open and close filler opening 98 of the fuel tank 100 to charge a fuel (gasoline in the present embodiment) to engine 99. Meanwhile, between the fuel tank 100 and the engine 99 are arranged roll over valve 97, canister 96, and evaporator 95 sequentially connected with a pipe.

Figure 2:
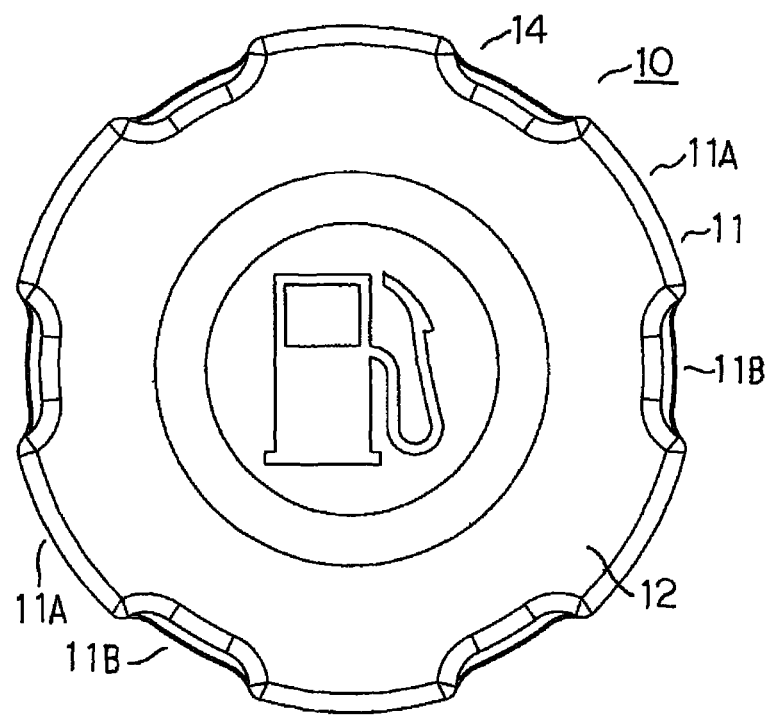
FIG. 2 is a plain view of the filler cap.
Figure 3:
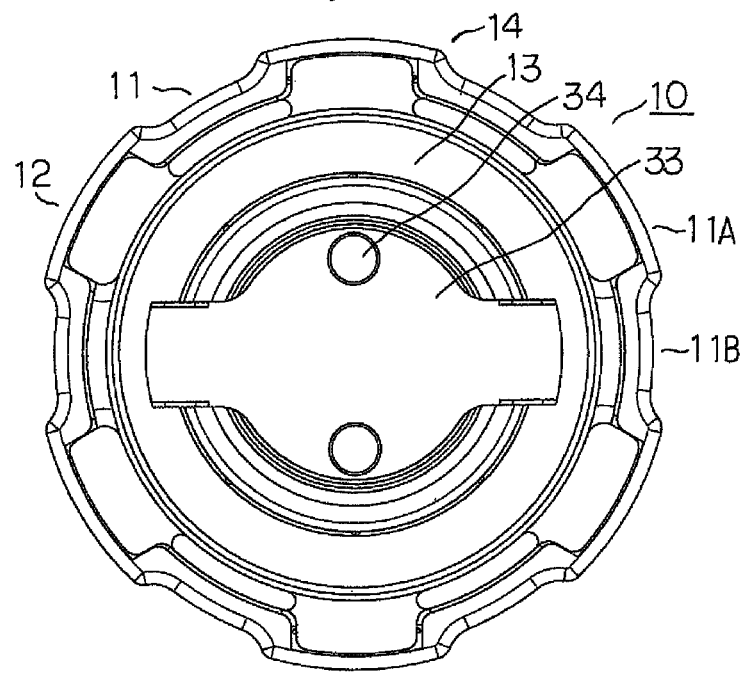
FIG. 3 is a backside view of the filler cap.
Figure 4:
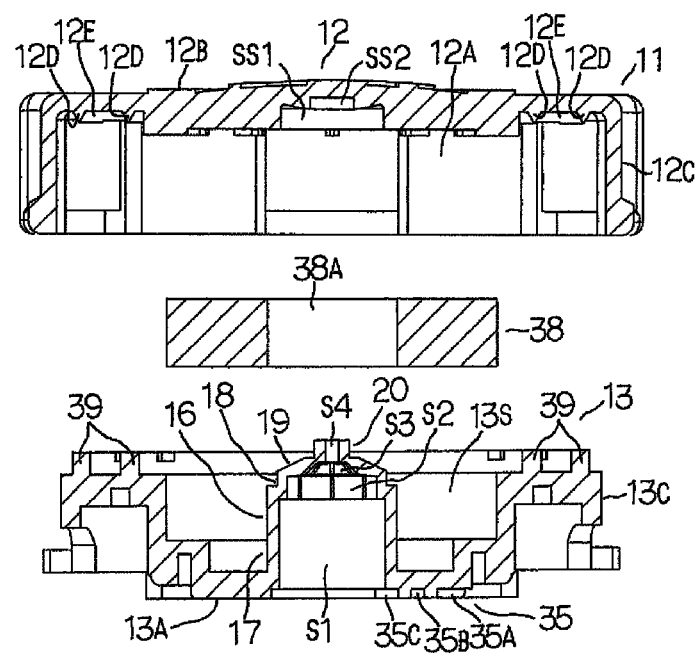
FIG. 4 is a vertical cross section view of the inner cap and the outer cap that constitute the filler cap, in the state of disassembled.
Figure 5:
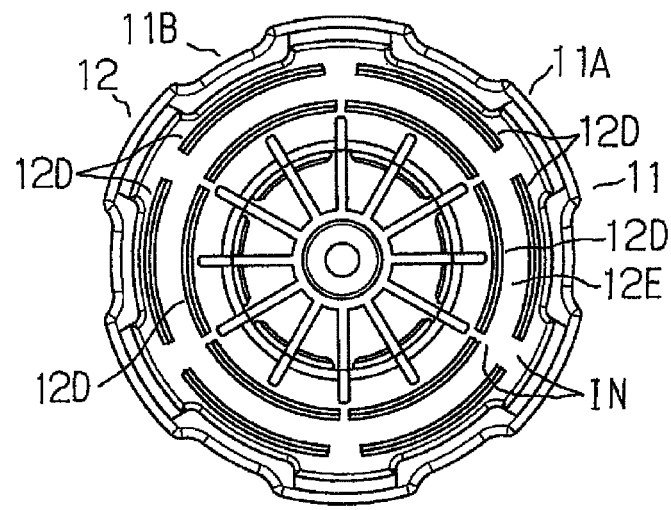
FIG. 5 is a backside view of the outer cap that constitutes the filler cap.

The filler cap 10 is arranged with, as shown in FIG. 2, FIG. 3, and FIG. 4, cap main body 14 composed of outer case 12 (hereinafter "outer cap") arranged with accommodation space 12A formed with concavoconvex portion 11 on side wall 12C for manual twist, and inner case 13 (hereinafter "inner cap") attached to inside the accommodation space 12A of this outer cap 12. In this inner cap 13 is arranged a valve mechanism described later. In the concavoconvex portion 11, convex portion 11A and concave portion 11B are arranged alternately.

The outer cap 12 is in the shape of almost a cylinder having a bottom and is arranged with upper wall 12B and side wall 12C; and inside the accommodation space 12A formed by the upper wall 12B and the side wall 12C is accommodated attached the inner cap 13 in the state attached with filter 38 described later.

Figure 6:
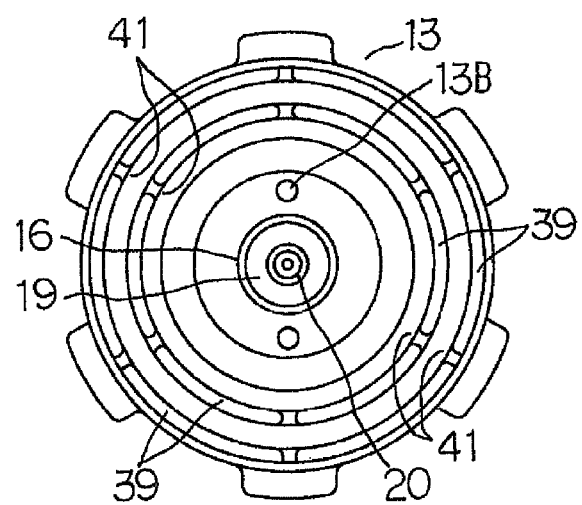
FIG. 6 is a frontside view of the inner cap that constitutes the filler cap.
Figure 7:
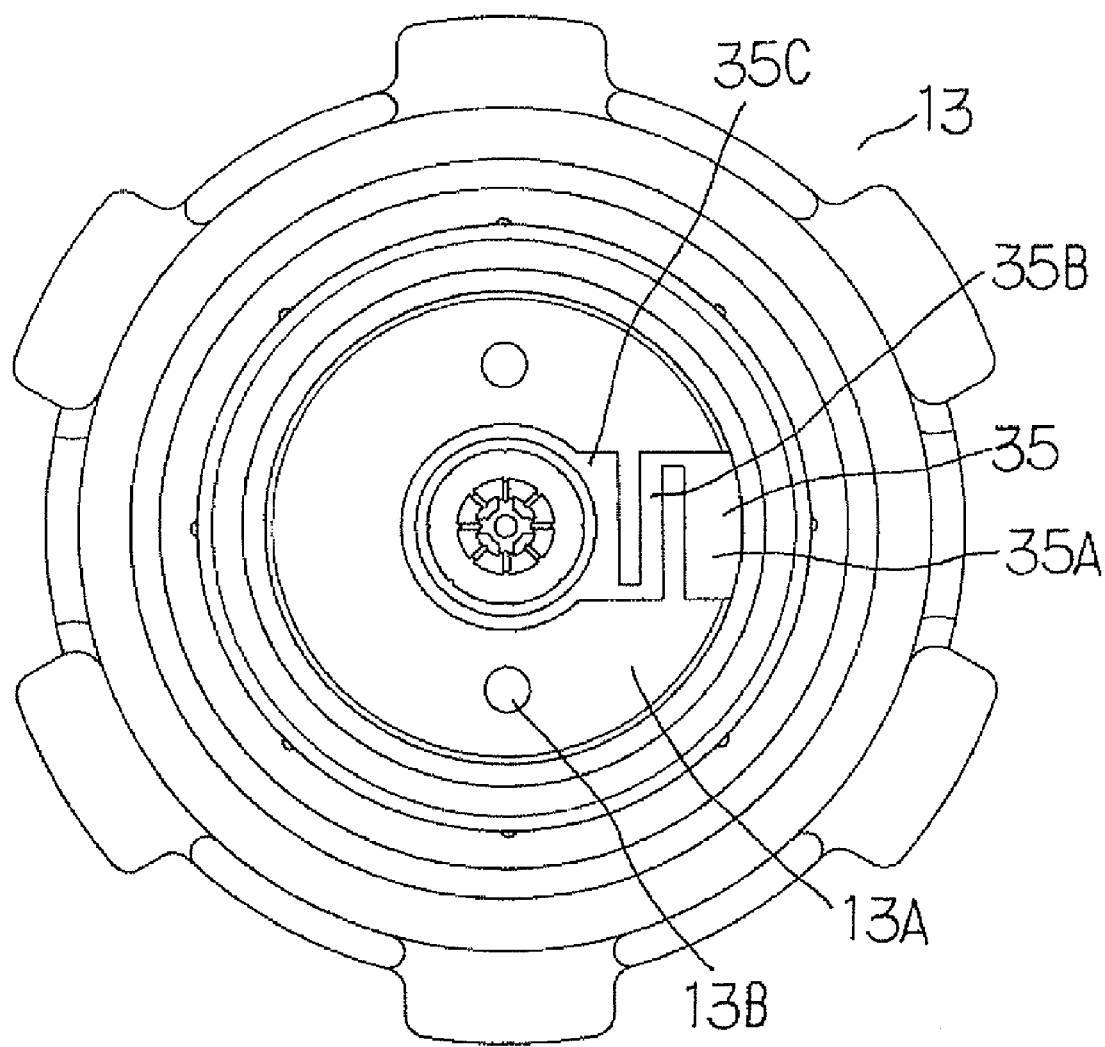
FIG. 7 is a backside view of the inner cap that constitutes the filler cap.

Then, as shown in FIG. 4 and FIG. 6, hollow cylinder main body 16 is vertically arranged almost at a center of inside of the inner cap 13. The cylinder main body 16 is composed of large-diameter cylinder portion 17 having a cylindrical shape and arranged so as to be continuously upward from bottom plane 13A of the inner cap 13, medium-diameter cylinder portion 18 having a smaller diameter than the large-diameter cylinder portion 17 and arranged continuously on the upper end of this large-diameter cylinder portion 17, shoulder cylinder portion 19 gradually decreasing the diameter thereof upward and arranged continuously on the upper end of this medium-diameter cylinder portion 18, and small diameter portion 20 having a small diameter and arranged continuously on the upper end of this shoulder cylinder portion 19.

Figure 9:
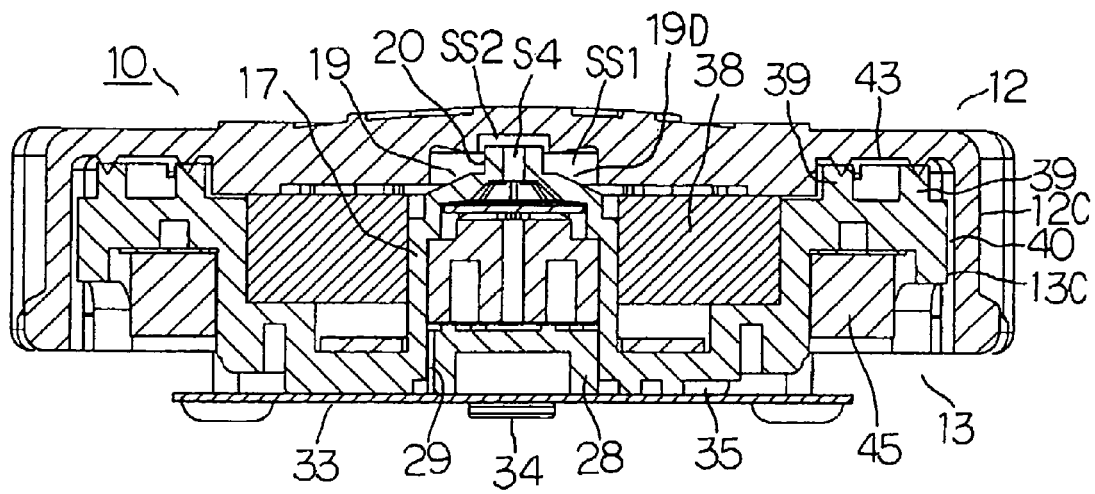
FIG. 9 is a vertical cross section view of the filler cap.

Then, as shown in FIG. 9, in the state that the inner cap 13 is attached so as to be accommodated in the outer cap 12, an upper part of the shoulder cylinder portion 19 and the small-diameter cylinder portion 20 of the inner cap 13 are accommodated in large diameter space SS1 formed at a central part of a backside of the outer cap 12 in the state of apart from the backside, and at the same time, the small-diameter cylinder portion 20 is accommodated in small diameter space SS2 connected to the large diameter space SS1 in the state of apart from the backside.

Figure 8:
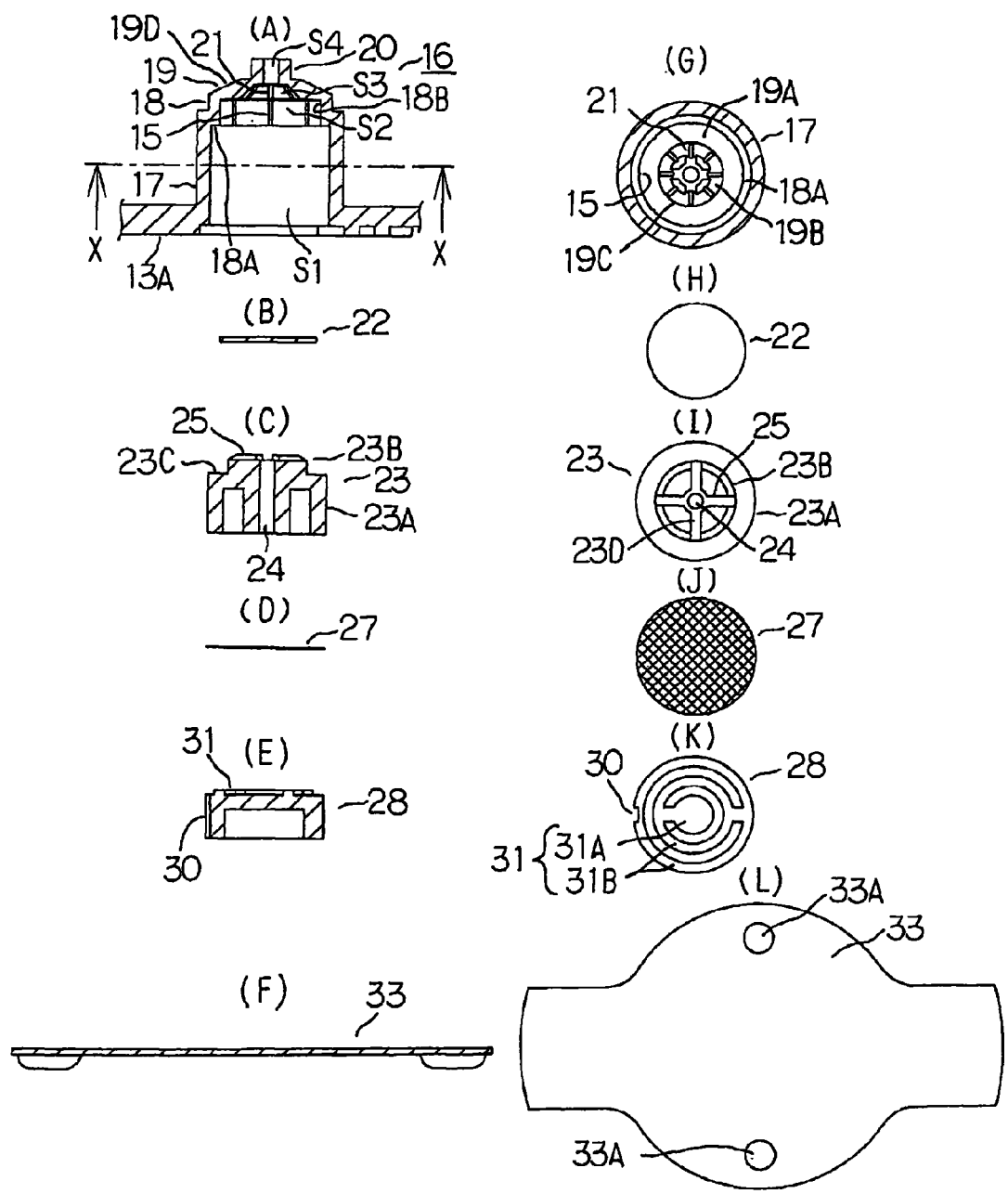
FIG. 8 is vertical cross section views of the cylinder main body of the outer cap and respective dissembled parts accommodated in this cylinder main body ((A) to (F)), an x-x cross section view of the cylinder main body (G), and plain views of the respective parts ((H) to (L))

Accordingly, as shown in FIG. 8, first space S1 of a columnar shape is formed in the large-diameter cylinder portion 17, second space S2 of a columnar shape having a smaller outer diameter than the first space Si and connected to this first space S1 is formed in the medium-diameter cylinder portion 18, third space S3 of a shape of almost a circular truncated cone connected to the second space S2 is formed in the shoulder cylinder portion 19, and fourth space S4 of a columnar shape connected to the third space S3 as well as to outside the fuel tank 100 (i. e., atmosphere) is formed in the small-diameter cylinder portion 20. Meanwhile, the shoulder cylinder portion 19 forming the third space S3 and having a wall 19D with a slanted surface 19A constitutes a valve portion of a valve mechanism portion that will be mentioned later.

Figure 10:
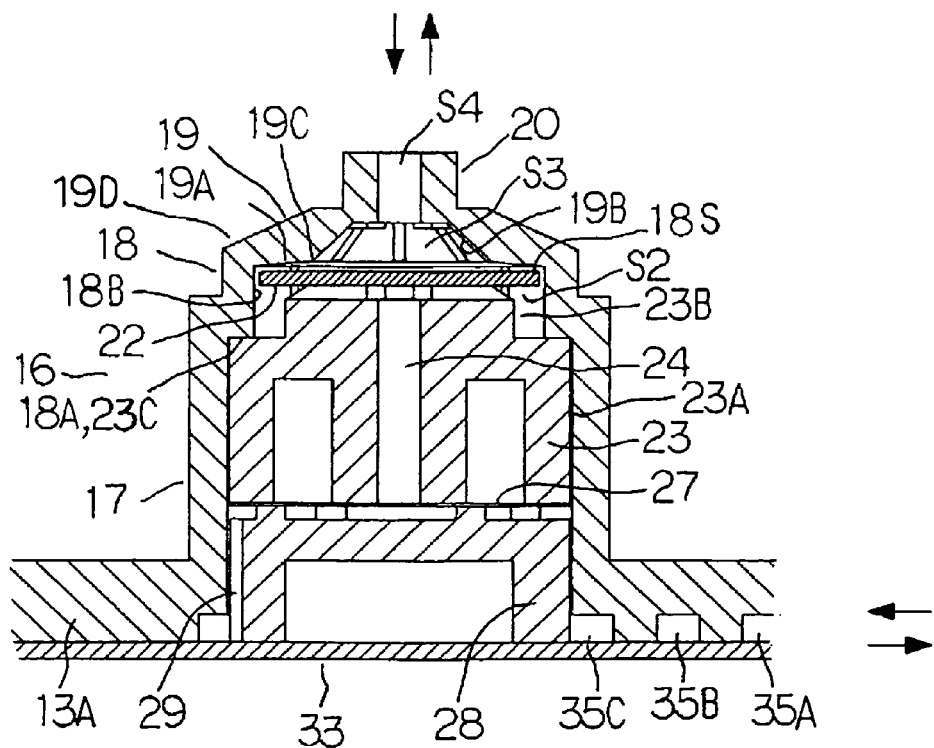
FIG. 10 is a vertical cross section view of an essential part of the inner cap in the state that pressures inside and outside the fuel tank are equilibrated whereby each of the air passage channels is open without moving in and out of an air.

Meanwhile, the third space S3 is formed in the shoulder cylinder portion 19, wherein, as shown in FIG.10, inside plane of this shoulder cylinder portion 19 is formed by the slanted surface 19A of the wall 19D (this is a bottom plane near outer edge connected to a surface 18B of the medium-diameter cylinder portion 18 which forms the second space S2, and is slightly slanted upward as moving toward inside) and a slanted surface 19B of the wall 19D (this is slanted upward, for example about 45 degrees, as continuously moving further toward inside along an inner side of the slanted surface 19A). The slanted surface 19A is connected, in its one end, to the surface 18B that forms the second space S2, and, in its other end, to the slanted surface 19B that forms the third space S3. Accordingly, the slanted surface 19A connects the surface 18B to the slanted surface 19B.

Then, as shown in FIG. 8, FIG. 9, and FIG. 10, valve body 22 is accommodated inside the second space S2 of the medium-diameter cylinder portion 18 under the state the valve body 22 is put on valve-body-supporting member 23 with having a gap 18S at the position slightly apart downward from the slanted surface 19A of the shoulder cylinder portion 19, for example, the distance to secure a stroke for movement, and thus for example, distance of about 0.01 mm to about 0.8 mm, under the state that a peripheral edge part of the valve body 22 does not contact to rib 15 (this will be mentioned later) arranged on the surface 18B of the medium-diameter cylinder portion 18. The valve-body-supporting member 23 to support the valve body 22 is accommodated in the uppermost part of the large-diameter cylinder portion 17, arranged therein with air passage channel 24 having almost a columnar outer shape at a center of a circular plain view in a manner to penetrate vertically, and arranged with lower large-diameter portion 23A and upper small diameter portion 23B. Upper plane of this small diameter portion 23B is chamfered so that diameter of the peripheral part thereof may be made smaller in the upward direction. Meanwhile, to ease the movement of the peripheral part of the valve body 22, the space of the gap 18S may be appropriately chosen in the foregoing range of 0.01 to 0.8 mm in accordance with the negative pressure or increase of the pressure inside the fuel tank 100.

Accordingly, the valve body 22 is put on the small diameter portion 23B, wherein the peripheral edge part of the valve body is slightly apart from the slanted surface 19A, and a central part of the upper plane of the valve body is faced to the third space S3 when this is put on.

Meanwhile, an outer diameter of the valve body 22 having a thin disk shape, for example, having thickness of about 0.05 to about 1.0 mm, is larger than the upper plane of the valve-body-supporting member 23 (plane to support the valve body 22); and the front edge of a plurality of projected rows of the rib 15 arranged on the surface 18B has a circular plain view having a smaller diameter than a circle on the circle's perimeter thereof. Here, the valve body 22 is made of an elastic material capable of deforming and also of resuming its original shape even deformed; and this has solvent-resistance to a solvent fuel—such as gasoline, kerosene, ethanol, and methanol—, heat-resistance (for example, 80° C. or higher), elasticity, flexibility, non-tackiness, and the like, and is formed of a light material not air-permeable.

Specifically, the valve body 22 is made of a fluorinated resin, a fluorinated rubber, nylon 6, nylon 66, and so on, and a rust-resisting metal material such as titanium and aluminum, wherein the valve body may be in the form of a thin plate or a film, and may be composed of an article or a foam body having independent air holes. Further, the valve body needs to be movable according to a pressure inside the fuel tank 100 and an outer atmosphere; and thus, the weight thereof is light.

Meanwhile, in the valve body 22, thickness thereof is not necessarily even entirely, but may be thicker in the central part than the peripheral part; and thus, for example, as shown in FIG. 17(M), which is a plain view of the valve body 22 in the second embodiment, and in FIG. 17 (N), which is a vertical cross section view going through a center of the valve body 22 similarly in the second embodiment, a lump portion 22A having a circular plain view with a smaller diameter than the diameter of the circle going through an upper edge of the slanted surface 19A (pivot point 19C mentioned later) of the shoulder cylinder portion 19 may be arranged on the upper central part thereof or on the lower central part thereof as well. The lump portion 22A has an outer shape of a circular arc. Alternatively, as shown in FIG. 17 (O), which is a vertical cross section view going through a center of the valve body in the third embodiment, the valve body 22 may be made gradually thicker toward the central part thereof in such a manner that the outer shape of the upper plane of the valve body 22 may appear like a circular cone whose thickest part is located at the central part thereof (meanwhile, the lower plane thereof may have the same shape). Further alternatively, as shown in FIG. 17 (P), which is a vertical cross section view going through a center of the valve body 22 in the third embodiment, the valve body 22 may be made gradually thicker toward the central part thereof in such a manner that the outer shape of the upper plane of the valve body 22 may appear like a circular arc whose thickest part is located at the central part thereof (meanwhile, the lower plane thereof may have the same shape). The above is done so that an impact resilience and a bending strength may be reinforced.

Above the small diameter portion 23B is formed groove 23D having a plain view of a cross shape and connecting the central part thereof to the upper end of the air passage channel 24, whereby forming, together with the valve body 22, air passage channel 25. An outer diameter of large diameter portion 23A of the valve-body-supporting member 23 is slightly smaller than an inner diameter of the large-diameter cylinder portion 17. An outer diameter of small diameter portion 23B of the valve-body-supporting member 23 is made smaller than an outer diameter of the valve body 22, in the range between 40% and 70% (both inclusive) relative to the outer diameter of the valve body 22; and, under the state that the valve body 22 is put on the valve-body-supporting member 23, a peripheral part of the valve body 22 is not put on the small diameter portion 23B, but is in the state of floating in the second space S2.

Accordingly, when this valve-body-supporting member 23 is accommodated into the large-diameter cylinder portion 17, the small diameter portion 23B thereof enters, in the state of putting on the valve body 22, into the medium-diameter portion 18, whereby, at the same time, leading to the state that a step 23C formed by the large diameter portion 23A and the small diameter portion 23B of the valve-body-supporting member 23 is contacted to a step 18A formed by the plane to form the first space S1 of the large-diameter cylinder portion 17 and the plane to form the second space S2 of the medium-diameter cylinder portion 18.

Then, on an inner plane to form the second space S2 in the medium-diameter cylinder portion 18 are formed toward its inside a plurality of projected rows of the rib 15 vertically extended with a prescribed distance therebetween, while on an inner plane to form the third space S3 having a circular truncated cone in the shoulder cylinder portion 19 are formed toward its inside a plurality of projected rows of the rib 21 vertically extended with a prescribed distance therebetween. With such measures, a contact resistance to the valve body 22 is reduced so that up and down movement of this valve body 22 may become smooth (refer to FIG. 8).

Reference numeral 27 indicates a thin-plate filter having a circular plain view and arranged below the valve-body-supporting member 23, wherein the diameter thereof is equal to the bottom diameter of the valve-body-supporting member 23. Reference numeral 28 is a filter-supporting body to support the filter 27, and as shown in FIG. 8 and FIG. 10, concave groove 30 is formed on a side thereof to form air passage channel 29 together with a plane that forms a space of the large-diameter cylinder portion 17. In addition, as shown in FIG. 8 (E) and (K), on the upper plane of this filter-supporting body 28 is formed air passage channel 31 that connects to an upper end of the air passage channel 29. This air passage channel 31 is labyrinthian, composed of connecting channel 31A connecting to the air passage channel 24 in a central part of the upper plane of the valve-body-supporting member 23 and connecting channel 31B connecting between this connecting channel 31A and the air passage channel 29.

Figure 18:
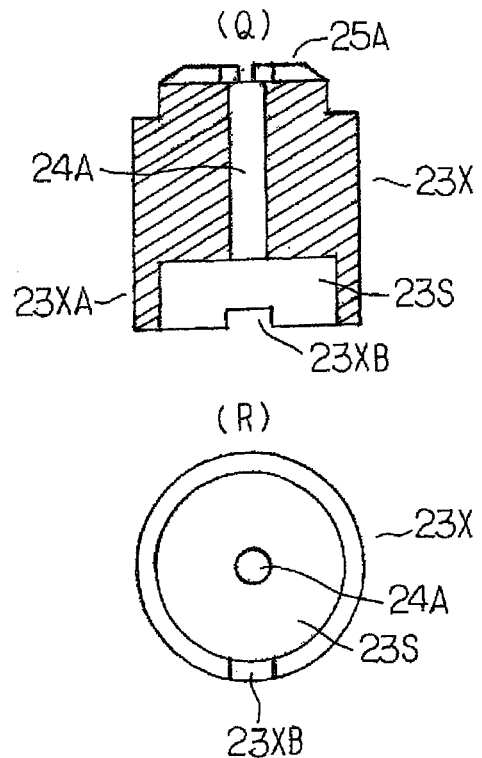
FIG. 18 shows a vertical cross section view of the valve-body-supporting member in another embodiment (Q), and similarly, a bottom view of the valve-body-supporting member in another embodiment (R)

Meanwhile, the filter 27 may not be necessarily arranged, or as shown in FIG. 18 (Q) and (R), the valve-body-supporting member 23 and the filter-supporting body 28 may be integrally formed. In this integrally formed valve-body-supporting member 23X are formed air passage channel 25A connected to the second space S2 at the upper part thereof, air passage channel 24A connected to the air passage channel 25A at the central part thereof, and space 23S connected to this air passage channel 24A. In addition, opening 23 XB connected to connecting channel 35C (this will be mentioned later) is arranged in the lower part of side 23XA that forms the space 23S.

Meanwhile, in the present embodiment, the outer cap 12, the inner cap 13, the valve body 22, the valve-body-supporting member 23, the filter 27, and the filter-supporting 28 are made of nylon 6 or nylon 66, which are synthetic resin materials having solvent-resistance to a solvent fuel, such as gasoline, kerosene, ethanol, and methanol.

Then, rivets 34 are inserted into fixing holes 13B formed at the bottom plane 13A of the inner cap 13 and fixing holes 33A formed in spring 33 made with a plate spring, whereby the spring 33 is fixed to the bottom plane 13A, so that air passage channel 35 is formed by the bottom plane 13A and the spring 33.

Meanwhile, the spring 33 is made of a metal material that is rust-resistant and not dissolved by the fuel. This spring 33 serves not only as a channel-forming body to form the air passage channel 35 and so on with the inner cap 13 but also as a fixture to fix the filler cap 10 (the filler cap main body 14) to the filler opening 98 of the fuel tank 100. A way to fix the filler cap 10 (the filler cap main body 14) to the filler opening 98 is not limited to the spring 33 made with a plate spring; fixing may be done with a screw.

When the foregoing screw type is employed, hollow outer cylinder portion 60 is formed at the lower part of the inner cap 13, and female screw part 61 is formed on the inner wall of this outer cylinder portion 60; and then, this female screw part is connected by a screw-threaded engagement to a male screw part formed on the filler opening 98 thereby attaching the filler cap 10 (the cap main body 14) to the filler opening 98.

The embodiment of the filler cap 10 in the case of this screw type will be explained in detail based on FIG. 19. In this embodiment, the valve-body-supporting member 23X shown in FIG. 18 is used, wherein, the opening 23XB is not arranged in this valve-body-supporting member 23X. Inner cylinder portion 62 is formed inside the outer cylinder portion 60, and then, the inner cylinder portion 62 is fitted to fitting groove 65 formed on a peripheral part of cap 64 in such a manner that the valve-body-supporting member 23X accommodated in the space of the large-diameter cylinder portion 17 may not drop off and the lower opening of the space 23S may be covered, thereby supporting the valve-body-supporting member 23X by the cap 64 held to the inner cap 13.

Then, in the central part of the cap 64 is formed air passage channel 66 whose upper part is connected to the space 23S and the lower part of this air passage channel 66 is connected to inside the fuel tank 100. That is, cap 68 to prevent a fluid wave motion is arranged in groove 67 that is formed underside of the cap 64; wherein, a bottom opening of the groove 67 is closed with the cap 68 except for a part 69 (fluid vent) that is connected to inside the fuel tank 100, while above this cap 68 are formed fluid passage channel 70 connected to the fluid vent 69 and the air passage channel 66.

Numerical reference 63 designates a gasket having an opening at the central part thereof; when the inner cylinder portion 62 is fitted to the fitting groove 65 of the cap 64, an escape can be prevented owing to turned edge 64A of the cap 64 because the outer diameter of the cap 64 is larger than the inner diameter of the gasket 63. Then, at the time when the filler cap 10 is attached to the filler opening 98, the mouth ring of the filler opening 98 is contacted to the gasket 63 for sealing by connecting the male screw formed on the filler opening 98 to the female screw 61 formed on the inner wall of the outer cylinder portion 60.

By the composition as mentioned above, inside and outside the fuel tank 100 are connected through. Meanwhile, the filler cap 10 may be attached to the filler opening 98 by forming a male screw part on the outer wall of this outer cylinder portion 60 and connecting thereof by a screw-threaded engagement to the female screw part formed on the filler opening 98.

Then, when the cap main body 14 is fixed to the filler opening 98 of the fuel tank 100 by the spring 33 as mentioned above, gasket 45 having a ring shape is contacted to the filler opening 98; with this, the filler opening 98 is sealed by the cap main body 14.

The air passage channel 35 is composed of connecting channel 35A connected to inside the fuel tank 100, connecting channel 35B that is winding (when viewed from the bottom thereof) and connected to this connecting channel 35A, and connecting channel 35C that is connected to this connecting channel 35B and to the air passage channel 29 and formed with a lower outer side of the filter-supporting body 28 accommodated in a space of the large-diameter cylinder portion 17.

The reason why the winding connecting channel 35B is formed as mentioned above is because it is intended that, when the automobile 101 is tilted greatly, the fuel from the fuel tank 100 may not run straightly, thereby relaxing an impact of the fuel from the fuel tank 100 applied to the valve body 22 of the filler cap 10.

Meanwhile, reference numeral 38 is a filter to prevent foreign matters such as a dust from entering into the fuel tank 100. The inner cap 13 is accommodated into the outer cap 12 under the state that this filter 38 is accommodated in the space 138 around the cylinder main body 16 of the inner cap 13; and then the outer cap 12 and the inner cap 13 are fixed. In other words, the filter 38 is accommodated in the space 138 of the inner cap 13 in such a manner that the cylinder main body 16 may be inserted into hollow portion 38A openly formed in a central part of the filter 38; and then, the outer cap 12 and the inner cap 13 are fixed.

In this case, convex portion 39 having a ring shape is arranged in doubleness on an upper plane of the inner cap 13, and from the side of this convex portion 39 is accommodated the inner cap 13 into the outer cap 12; on the other hand, two projected rows of melt-adhesive rib 12D is arranged in prescribed distances with gap 12E in a backside of upper wall 12B of the outer cap 12, and then each of this melt-adhesive ribs 12D is fixed with the convex portion 39 of the inner cap 13 by melt adhesion with ultrasonic wave.

Then, under the state that the inner cap 13 is accommodated in the outer cap 12, gap 40 is formed between an inner surface of the side wall 12C of the outer cap 12 and an outer surface of side wall 13C of the inner cap 13 (refer to FIG. 9). A lower end of this gap 40 is open thereby serving as an air opening that is connected to an atmosphere outside the filler cap 10 (outside the automobile 101).

A plurality of groove 41 is formed with prescribed distances at each of the convex portion 39 on an upper plane of the inner cap 13, while a plurality of the melt-adhesive rib 12D arranged on the outer cap 12 is not arranged in a position (with distance of IN) avoiding to face to the groove 41 formed at each of the convex portion 39 of the inner cap 13. With this measure, the composition is made so that the groove 41 formed at each of the convex portion 39 may not be blocked by the melt-adhesive rib 12D upon fixing the outer cap 12 with the inner cap 13 by melt adhesion with ultrasonic wave.

Accordingly, air passage channel 43 is formed between the outer cap 12 and the inner cap 13, whereby an outside air can be introduced into the fuel tank 100 via this filler cap 10, whereas volatile organic compound gas (hereinafter this gas is abbreviated as "VOC gas") in the fuel tank 100 can be discharged to outside the fuel tank 100 via the air passage channel 43 and the gap 40 only when pressure of the VOC gas above a deformation strength prescribed to the valve body 22 is applied to this valve body 22. Thus, this valve mechanism portion is composed of the cylinder main body 16, the valve-body-supporting member 23, and the valve body 22, and functions as a safety valve as well as a one-way valve.

Meanwhile, when pressure of the VOC gas (or fuel) is below a deformation strength prescribed to the valve body 22, an upper peripheral edge part of the valve body 22 is contacted to the slanted surface 19A, thereby shutting down the connection between the second space S2 and the third space S3 that is connected to an atmosphere; and as a result, the harmful VOC gas (or fuel) is not discharged to outside the filler cap 10, or in other words, the connection between the second space S2 and the third space S3 is always shut down when pressure inside the fuel tank 100 is within the pressure of a deformation strength prescribed to the valve body 22; and thus, the VOC gas (or fuel) is not discharged to outside the filler cap 10.

Then, based on the composition mentioned above, fabrication of the filler cap 10 will be explained. Meanwhile, it is supposed that the inner cap 13 is accommodated in the outer cap 12 under the state that the cylinder main body 16 of the inner cap 13 is inserted into the hollow portion 38A of the filter 38, whereas each of the melt-adhesive ribs 12D of the outer cap 12 and each of the projections 39 of the inner cap 13 are fixed by melt adhesion with ultrasonic wave so that the inner cap 13 and the outer cap 12 are fixed.

Firstly, for example, the valve-body-supporting member 23 is accommodated in an upper part of the large-diameter cylinder portion 17 under the state that the valve body 22 is put on the valve-body-supporting member 23. By doing so, the small diameter portion 23B of the valve-body-supporting member 23 enters into the medium-diameter cylinder portion 18 under the state of putting the valve body 22 thereon, whereby, at the same time, leading to the state that the step 23C formed by the large diameter portion 23A and the small diameter portion 23B of the valve-body-supporting member 23 is contacted to the step 18A formed by the plane to form the first space SI of the large-diameter cylinder portion 17 and the plane to form the second space S2 of the medium-diameter cylinder portion 18. At this time, the valve body 22 is accommodated inside the second space S2 of the medium-diameter cylinder portion 18 at the position slightly apart from the slanted surface 19A of the shoulder cylinder portion 19 with having the gap 18S (for example, a gap of 0.01 to 0.8 mm to secure the stroke for moving).

Then, under the state that the filter-supporting body 28 mounted with the filter 27 is accommodated in the first space S1 of the large-diameter cylinder portion 17, rivets 34 are inserted into the fixing holes 13B formed at the bottom plane 13A of the inner cap 13 and the fixing holes 33A formed in the spring 33 thereby fixing the spring 33 to the bottom plane 13A. With this, fabrication of the filler cap 10 arranged with the valve mechanism portion is completed. Then, the filler cap 10 fabricated in the way as described above is attached so as to cover the filler opening 98, and then used.

Then, action of the filler cap 10 will be explained based on FIG. 10 to FIG. 15. Firstly, immediately after the filler cap 10 is attached so as to cover the filler opening 98 with the fuel tank 100 being filled with a fuel, pressures inside and outside the fuel tank 100 are equilibrated; and thus, under the state that an air does not move in and out, each air passage channel of the filler cap 10 for moving in and out of an air is open, whereby inside and outside the fuel tank 100 is in the state of being connected (refer to FIG. 10).

That is, the valve body 22 is put on the valve-body-supporting member 23; this valve body 22 is accommodated in the second space S2 of the medium-diameter cylinder portion 18 at the position slightly apart from the slanted surface 19A of the shoulder cylinder portion 19 with having the gap 18S; and inside and outside the fuel tank 100 are connected via the air passage channel 43 between the outer cap 12 and the inner cap 13 of the filler cap 10, the air passage channel inside the cylinder main body 16, the air passage channel inside the valve-body-supporting member 23, the air passage channel 25 between the valve-body- supporting member 23 and the filter-supporting body 28, the air passage channel 29 between the filter-supporting body 28 and the large-diameter cylinder portion 17, and the air passage channel 35 between the bottom plane 13A of the inner cap 13 and the spring 33; and thus, as described above, each air passage channel of the filler cap 10 for moving in and out of an air is in the state of open.

To explain in more detail, inside and outside the fuel tank 100 are connected via the gap 40 between the side wall 12C of the outer cap 12 and the side wall 13C of the inner cap 13, the space between the filter 38 and the backside of the outer cap 12, the large diameter space SS1 and the small diameter space SS2 between the outer cap 12 and the inner cap 13, the fourth space S4 in the small-diameter cylinder portion 20 of the cylinder main body 16, the third space S3 in the shoulder cylinder portion 19, the second space S2 in the medium-cylinder portion 18, the air passage channel 25 between the valve body 22 and the valve-body-supporting member 23, the air passage channel 24 of the valve-body-supporting member 23, the air passage channel 31 in the upper part of the filter-supporting body 28, the air passage channel 29 formed between the filter-supporting body 28 and the large-diameter cylinder portion 17, and the air passage channel 35 formed by the bottom plane 13A of the inner cap 13 and the spring 33; and thus, as described above, each air passage channel of the filler cap 10 for moving in and out of an air is in the state of open.

Figure 11:
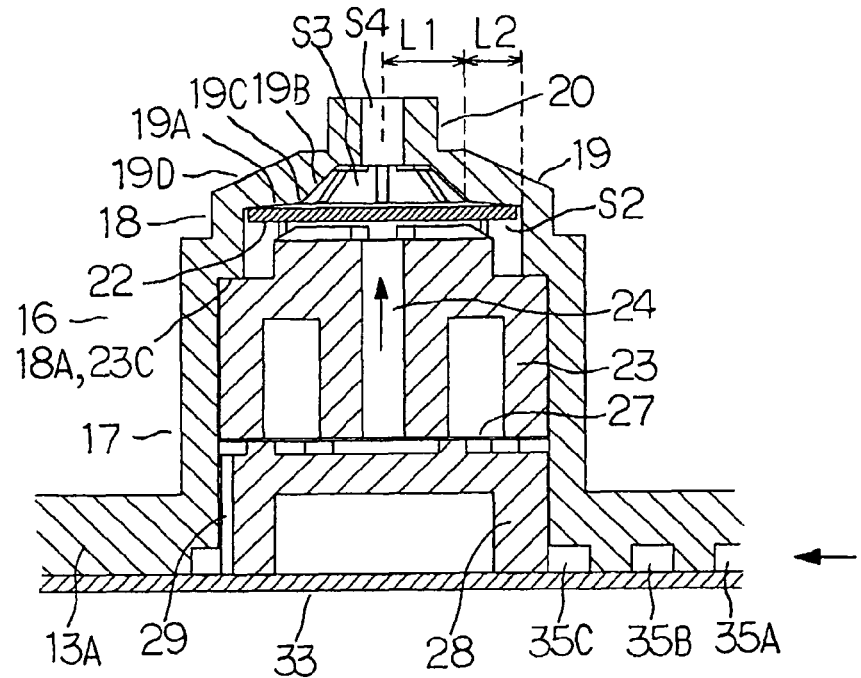
FIG. 11 is a vertical cross section view of an essential part of the inner cap in the state that, because of an increased inner pressure of a vaporized gas generated by evaporation of a fuel in the fuel tank, an upper peripheral edge part of the valve body is contacted to the slanted wall of the shoulder cylinder portion that forms the second space.

Then, when outside temperature is increased while the engine 99 is not driven thereby generating a vaporized gas (VOC gas) by evaporation of the fuel in the fuel tank 100, an inner pressure of the fuel tank 100 is increased, thereby moving the valve body 22 upward, because it is light. As a result, as shown in FIG. 11, the upper peripheral edge part of this valve body 22 is contacted to the slanted surface 19A of the shoulder cylinder portion 19 that forms the second space S2 (refer to FIG. 11).

However, in this case, if the pressure inside the fuel tank 100 is increased to, for example 0.1 kPa, the upper peripheral edge part of the valve body 22 moved upward is contacted to the slanted surface 19A with a line contact. With this contact, the connection between the second space S2 and the third space S3 (this is connected to an atmosphere) in the cylinder main body 16 is shut down.

Accordingly, even if the VOC gas is generated by evaporation of the fuel in the fuel tank 100, discharge thereof to outside the automobile 101 can be prevented from occurring due to the valve body 22 inside the filler cap 10. Because of this, environmental pollution can be prevented without discharging the harmful VOC gas evaporated from the fuel to outside the automobile 101.

As the outside temperature is further increased while the engine 99 is not driven thereby increasing amount of the VOC gas generated by evaporation of the fuel in the fuel tank 100 and thus further increasing the inner pressure of the fuel tank 100, a central part of the valve body 22 is sagged upward thereby increasing the entering amount thereof into the third space S3; and as a result, state of the contact of the upper peripheral edge part of the valve body 22 to the slanted surface 19A changes from the line contact to the plane contact thereby gradually increasing the contact area therebetween.

Meanwhile, in the case that the valve body 22 is put on the small-diameter portion 23B under the state that the connection between the second space and the third space is blocked by contacting the peripheral edge part of the valve body 22 to the slanted surface 19A without having the gap 18S between the valve body 22 and the slanted surface 19A of the shoulder cylinder portion 19, when the pressure inside the fuel tank 100 becomes 0.1 kPa or higher, as the inner pressure of the fuel tank 100 increases, similarly to the case that the valve body 22 is arranged with having the gap 18S, the central part of the valve body 22 is sagged upward thereby increasing the amount thereof sagged into the third space S3; and this in turn leads to gradual increase of the plane contact area from the state of the line contact between the upper peripheral edge part of the valve body 22 and the slanted surface 19A.

Figure 12:
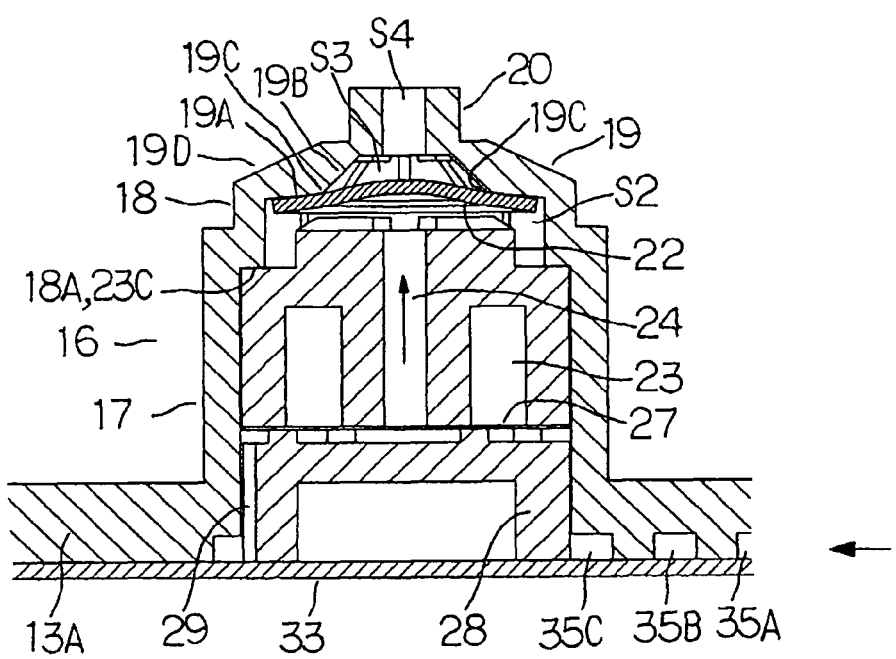
FIG. 12 is a vertical cross section view of an essential part of the inner cap in the state that, because of a further increased inner pressure of a vaporized gas generated by evaporation of a fuel in the fuel tank, a peripheral part of the valve body with a prescribed width thereof is closely contacted by a plane contact to the slanted wall of the shoulder portion that forms the second space.

Then, when the pressure inside the fuel tank 100 is increased to, for example 1 kPa or higher, in any of the cases that the valve body 22 is arranged with having the gap 18S as mentioned above or not having the gap 18S, the central part of this valve body 22 is significantly sagged upward thereby deforming in such a manner that the central part of the valve body 22 is sagged upward to shorten the outer diameter thereof (by the plain view), as shown in FIG. 12; and as a result, the line contact of the upper peripheral edge part of the valve body 22 to the slanted surface 19A is changed to the close plane contact of the peripheral part of this valve body 22 with a prescribed width thereof to the slanted surface 19A until the pressure reaches a deformation strength prescribed to the valve body 22, for example 3 kPa.

Accordingly, even when amount of the VOC gas generated by evaporation of the fuel is increased beyond the situation shown in FIG. 11, discharge of this VOC gas to outside the automobile 101 can be prevented from occurring by the valve body 22. Because of this, not only fuel consumption of the automobile 101 can be improved but also environmental pollution can be prevented without discharging the harmful VOC gas evaporated from the fuel to outside the automobile 101.

As mentioned above, before the pressure inside the fuel tank reaches, such as for example 3.0 kPa, which is a pressure of the deformation strength prescribed to the valve body 22 as will be mentioned later, discharge of the VOC gas generated by evaporation of the fuel to outside the automobile 101 can be prevented from occurring by the valve body 22. In addition, even when the automobile 101 is tilted about 30 degrees while the engine 99 is not driven, discharge of the fuel to outside the automobile 101 can be prevented from occurring. In other words, because the peripheral part of this valve body 22 with a prescribed width thereof is closely contacted to the slanted surface 19A by the plane contact due to the fluid pressure of the tilted fuel, discharge of the fuel to outside the automobile 101 can be prevented from occurring.

Meanwhile, applicant of the present invention carried out a fuel leak test with tilting the fuel tank 100; and the results thereof are as following. Namely, at the outside temperature of 30° C., there was no fuel leakage even after passage of 10 minutes when the fuel tank was tilted 20 degrees; likewise, no fuel leakage with the tilting angle of 30 degrees even after passage of 10 minutes; likewise, no fuel leakage with the tilting angle of 45 degrees even after passage of 10 minutes; likewise, no fuel leakage with the tilting angle of 90 degrees even after passage of 3 minutes; and likewise, no fuel leakage with the tilting angle of 180 degrees even after passage of one minute.

Meanwhile, results of the fuel leak test with the tilted fuel tank 100 by using an air cap not arranged in the air passage channel with the valve mechanism of the present embodiment mentioned above are as following. Namely, according to the first test with the tilting angle of the fuel tank 100 being 20 to 30 degrees, the fuel leakage started after passage of about one minute; and according to the second test with the same condition, the fuel leakage started after passage of about 10 seconds.

As the outside temperature is further increased, while the engine 99 is not driven, thereby further increasing amount of the VOC gas generated by evaporation of the fuel in the fuel tank 100 and thus further increasing the inner pressure of the fuel tank 100 beyond the deformation strength prescribed to the valve body 22, in any of the cases that the valve body 22 is arranged with having the gap 18S as mentioned above or not having the gap 18S the central part of the valve body 22 is sagged further upward because the valve body 22 cannot resist to deformation by the pressure.

Figure 13:
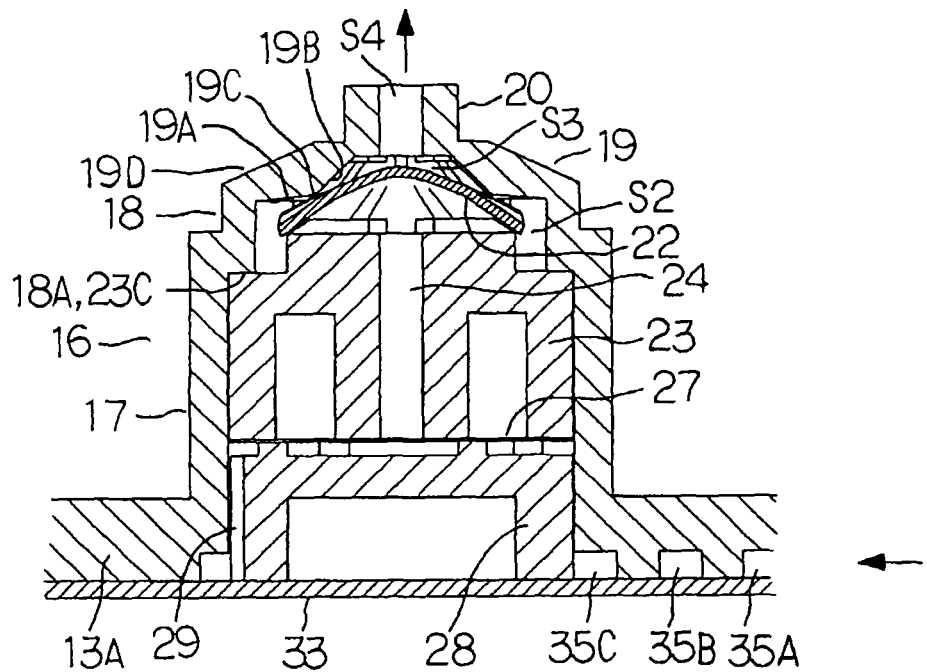
FIG. 13 is a vertical cross section view of an essential part of the inner cap in the state that a pressure inside the fuel tank is increased to 3 kPa or higher by a vaporized gas generated by evaporation of a fuel in the fuel tank.
Figure 14:
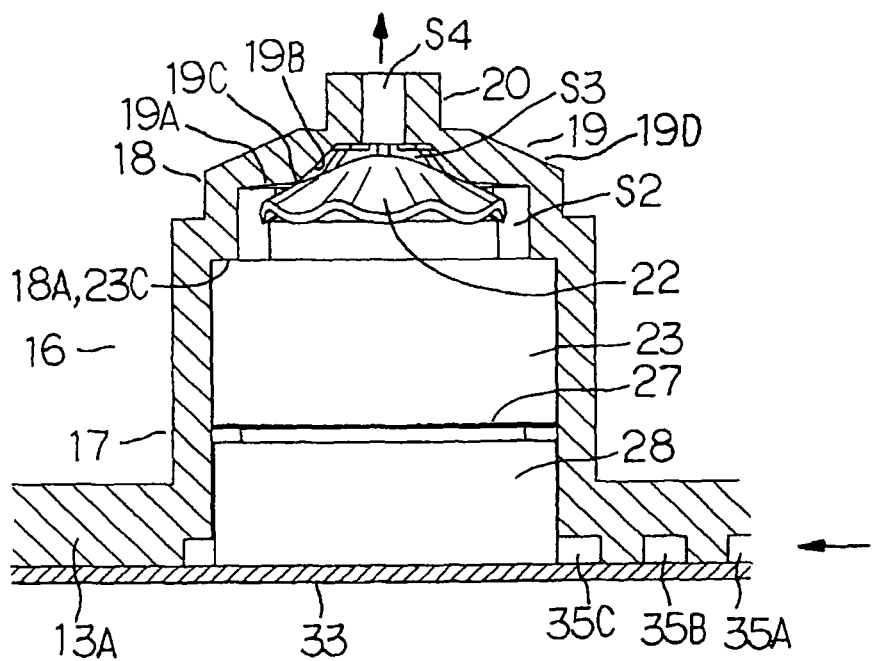
FIG. 14 is a vertical cross section view of an essential part of the inner cap in the state that a pressure inside the fuel tank is increased to 3 kPa or higher by a vaporized gas generated by evaporation of a fuel in the fuel tank, whereas a valve body and so on accommodated inside the inner cap are not vertically cut cross-sectionally.

In other words, as shown in FIG. 13 and FIG. 14, the central part of the valve body 22 is sagged further upward, whereby causing deformation so as to shorten the outer diameter thereof by a plain view, namely, by seeing from the above. Accordingly, as shown in FIG. 14, because this valve body 22 is made of an elastic material thereby having flexibility, the central part of this valve body is raised so as to enter into the third space S3 with deforming, like a folded umbrella, to shorten the outer diameter thereof, whereby moving the position contacted to pivot point 19C (this point is the boundary part between the slanted surface 19A and the slanted surface 19B of the valve body 22 toward the outside position in this valve body; and consequently, the valve body 22 forms wrinkles by folding thereof in proportion to this movement, thereby deforming to form, in the peripheral part of this valve body 22, a portion contacted to the pivot point 19C and a portion not contacted to the pivot point 19C with forming a concave portion.

Because of this, when the pressure inside the fuel tank 100 reaches above the pressure of the deformation strength prescribed to the valve body 22 thereby causing significant deformation of this valve body 22 as mentioned above (for example, 3 kPa or higher), the second space S2 and the third space S3 become in the state of being connected via the space of the concave portion not contacted to the pivot point 19C. Consequently, an excessive pressure (including the VOC gas) inside the fuel tank 100 is instantaneously released to outside the fuel tank 100, namely outside the automobile 101, via the air passage channel 43 between the outer cap 12 and the inner cap 13 and the gap 40 (refer to FIG. 13 and FIG. 14); and as a result, the pressure inside the fuel tank 100 becomes lower than the pressure of the deformation strength prescribed to the valve body 22.

Accorsingly, when the pressure inside the fuel tank 100 is increased to a prescribed pressure, the second space S2 and the third space S3 are made connected thereby discharging the VOC gas in the fuel tank 100 to outside the fuel tank 100. The reason for taking such a measure is because, otherwise, there is a danger that the fuel may be splattered outside the automobile 101 by the pressure inside the fuel tank 100 upon removing the filler cap 10 from the automobile 101; and thus, the valve mechanism portion mentioned above functions as a safety valve.

As mentioned above, in the shoulder cylinder portion 19, an inner space of the shoulder cylinder portion 19 of the cylinder main body 16 is formed, thereby forming the slanted surface 19A, to which the peripheral edge part of the valve body 22 is contacted, and the third space S3, into which the central part of the valve body 22 can be entered while connecting to the fourth space S4 of the small-diameter cylinder portion 20 that is connected to an outside atmosphere; and as shown in FIG. 11, by changing the ratio of distance L1 between the vertical center axis of the shoulder cylinder portion 19 and the pivot point 19C to distance L2 between the pivot point 19C and the peripheral edge of the slanted surface 19A (this distance could also be the distance between the pivot point 19C and the peripheral edge part of the valve body 22), a deformation strength of the valve body 22 can be prescribed by applying the principle of leverage with the pivot point 19C.

Accordingly, the pressure to effect the connection or to shut down the connection between the second space S2 and the third space S3 in the cylinder main body 16 by the valve body 22, namely the pressure to effect the connection or to shut down the connection between inside and outside the fuel tank 100, can be prescribed. As mentioned above, by combination of the principle of leverage with the strength of the valve body 22 determined by material, thickness, size, and so on thereof, the pressure to deform the valve body 22 with the pivot point 19C can be prescribed variably.

Meanwhile, the diameter of the circle passing through the upper end of the slanted surface 19A (the pivot point 19C) of the shoulder cylinder portion 19 is made between 45% and 65% (both inclusive) relative to the outer diameter of the valve body 22. This is because, when above this limit, a closely contacted area of the valve body 22 (closely contacted area to the slanted surface 19A) is diminished, and on the other hand, when below this limit, upward sagging of the valve body 22 is difficult. Further, the outer diameter of the upper plane of the small diameter portion 23B of the valve-body-supporting member 23 is made between 40% and 70% (both inclusive) relative to the outer diameter of the valve body 22. The diameter of the circle passing through the upper end of the slanted surface 19A (the pivot point 19C) of the shoulder cylinder portion 19 and the outer diameter of the upper plane of the small diameter portion 23B are variable depending on the pressure that is prescribed by the strength of the valve body 22 and the principle of leverage.

Meanwhile, in the present embodiment, the foregoing ratio of L1 to L2 is determined so that the valve body 22 may be changed from the state of FIG. 12 to the state of FIG. 13 and FIG. 14, when the pressure inside the fuel tank 100 reaches, for example, 3 kPa.

Then, as mentioned above, when the pressure inside the fuel tank 100 reaches, such as for example, 3 kPa thereby causing significant deformation of the valve body 22, the second space S2 and the third space S3 are connected via a space of the concave portion not contacted to the pivot point 19C of the valve body 22; and as a result, an excessive pressure (including the VOC gas) inside the fuel tank 100 is instantaneously released to outside the fuel tank 100, whereby the state of FIG. 13 and FIG. 14 is changed to the state of FIG. 12 in which the pressure inside the fuel tank 100 becomes lower than the pressure of the deformation strength prescribed to the valve body 22.

That is, as mentioned above, the peripheral part of the valve body 22 with the prescribed width is closely contacted to the slanted surface 19A by the plane contact, thereby shutting down the connection between the second space S2 and the third space S3; and as a result, discharge of the VOC gas to outside the automobile 101 can be prevented from occurring.

Meanwhile, hereinafter an explanation will be made as to the case that the pressure inside the fuel tank 100 becomes negative by consumption of the fuel due to the drive of the engine 99 under the state that the fluid pressure of the fuel is acting to the valve body 22. The state that the fluid pressure of the fuel is acting to the valve body 22 corresponds to the state that the fuel tank 100 is full by the fuel while the automobile 101 is not tilted, the state that the fuel is contacted to the valve body 22 while the automobile 101 is tilted thereby tilting the fuel tank 100, the state that the liquid level of the fuel is above the valve body 22 while the fuel tank 100 is tilted similarly to the above, the state that the fuel tank 100 is reversed upside down by 180 degrees, and so on.

Under the states that these fluid pressures are acting to the valve body 22, the valve body 22 is in the state of FIG. 11 or FIG. 12 depending on the fluid pressure due to head of the fuel. When the pressure inside the fuel tank 100 becomes negative by consumption of the fuel due to the drive of the engine 99 under these states, the valve body 22 changes from the state of a small fluid pressure of FIG. 11 or a large fluid pressure of FIG. 12 to the state shown by FIG. 15, thereby enlarging the gap 188 to introduce more atmospheric air into the fuel tank 100.

Figure 15:
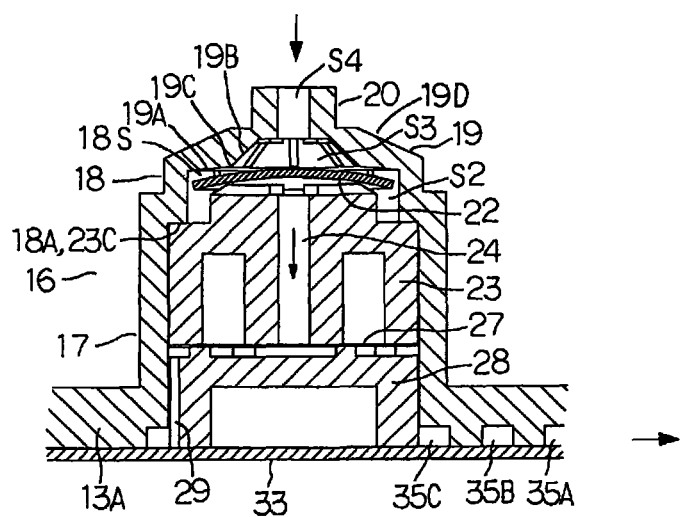
FIG. 15 is a vertical cross section view of an essential part of the inner cap in the state that a pressure inside the fuel tank is negative.

Namely, as shown in FIG. 15, because the outer diameter of the valve body 22 is larger than the outer diameter of the upper plane of the valve-body-supporting member 23 (the plane to support the valve body 22), the peripheral part of the valve body 22 is sucked toward the fuel tank 100; and as a result, the peripheral part of the flexible valve body 22 changes to the state of hanging down with the pivot point of the upper peripheral edge part of the valve-body-supporting member 23. With this, the gap 18S (space) between the valve body 22 and the slanted surface 19A of the shoulder cylinder portion 19 is enlarged, thereby causing instantaneous entering of an atmospheric air from outside the automobile 101 into the fourth space S4, the third space S3, and the second space S2, via the air passage channel 43 and the gap 40 between the outer cap 12 and the inner cap 13.

As shown in FIG. 15, when the pressure inside the fuel tank 100 becomes an atmospheric pressure by entering of an atmospheric air into the fuel tank 100, the valve body 22 is pushed back by the fluid pressure; and as a result, the state shown by FIG. 15 changes to the state shown by FIG. 11 or FIG. 12. Accordingly, the state shown by FIG. 11 or FIG. 12 and the state shown by FIG. 15 occur repeatedly; and thus, even if the fuel tank 100 is tilted, the engine 99 can be driven by taking an atmospheric air into the fuel tank 100 as far as the fluid pressure is lower than the pressure of the deformation strength prescribed to the valve body 22.

Then, hereinafter an explanation will be made as to the case that the pressure inside the fuel tank 100 becomes negative by consumption of the fuel due to the drive of the engine 99 under the state that the fluid pressure of the fuel is not acting to the valve body 22. The state that the fluid pressure of the fuel is not acting to the valve body 22 corresponds to, under the state that the fuel tank 100 is not full by the fuel, the state that the fuel is not contacted to the valve body 22 because the fuel in the fuel tank 100 is small while the automobile 101 is not tilted, the state that the fuel is not contacted to the valve body 22 because the fuel in the fuel tank 100 is small while the automobile 101 is tilted thereby tilting the fuel tank 100, the state that the liquid level of the fuel is lower than the valve body 22 because the fuel in the fuel tank 100 is small while the fuel tank 100 is tilted similarly to the above, and so on.

In the case that the fuel is not contacted to the valve body 22 because the fuel in the fuel tank 100 is small while the automobile 101 is not tilted, when the pressure inside the fuel tank 100 becomes negative, the valve body 22 drops from the state shown by FIG. 11 or FIG. 12 onto the small-diameter portion 23B of the valve-body-supporting member 23 thereby becoming to the state shown by FIG. 10 so that the gap 18S between the valve body 22 and the slanted surface 19A may be secured; and as a result, an atmospheric air enters into the fuel tank 100 so that the pressure inside the fuel tank 100 may become the state of an atmospheric pressure.

Further, in the case that the fuel is not contacted to the valve body 22 because the fuel in the fuel tank 100 is small while the automobile 101 is tilted thereby tilting the fuel tank 100, such as for example, by 45 degrees, when the pressure inside the fuel tank 100 becomes negative, the valve body 22 drops from the state shown by FIG. 11 or FIG. 12 onto the small-diameter portion 23B of the valve-body-supporting member 23 thereby becoming to the state shown by FIG. 10, as mentioned before, so that the gap 18S may be secured; and as a result, an atmospheric air enters into the fuel tank 100 so that the pressure inside the fuel tank 100 may become the state of an atmospheric pressure.

Further, similarly to the above, in the case that the liquid level of the fuel is lower than the valve body 22 because the fuel in the fuel tank 100 is small while the fuel tank 100 is tilted, such as for example, by 90 degrees, when the pressure inside the fuel tank 100 becomes negative, the valve body 22 changes from the state shown by FIG. 11 or FIG. 12 to the state that the valve body contacts to the upper plane of the small-diameter portion 23B of the valve-body-supporting member 23 and at the same time the lower end of the valve body 22 contacts to the surface 18B of the medium-diameter cylinder portion 18. As a result, the gap 18S is secured; and thus, an atmospheric air enters into the fuel tank 100 so that inside the fuel tank 100 may become the state of an atmospheric pressure.

As discussed above, even when the pressure inside the fuel tank 100 becomes negative by consumption of the fuel due to the drive of the engine 99 under the state that the fluid pressure of the fuel is not acting to the valve body 22, the gap 18S can be secured so that an atmospheric air may enter into the fuel tank 100; and thus, driving of the engine 99 may be continued.

Then, when the pressure inside the fuel tank 100 is increased, the state shown by FIG. 11 or FIG. 12 is resulted, as mentioned before; and when the fuel is consumed thereby leading to the negative pressure inside the fuel tank 100 again, the gap 18S is secured so that an atmospheric air may enter into the fuel tank 100, as mentioned before.

Meanwhile, in the case that the gap 18S between the valve body 22 and the slanted surface 19A is set small, when the pressure in the fuel tank 100 becomes negative under the state that the fluid pressure of the fuel is not acting to the valve 22 even if the fuel tank 100 is tilted, the resistance of the air passage channel through which an atmospheric air enters into the fuel tank 100 is increased thereby leading to amount of the air entering into the fuel tank 100 insufficient relative to the negative pressure; and then, as shown in FIG. 15, the peripheral part of the valve body 22 hangs down thereby enlarging the gap 18S so that more amount of an air may enter into the fuel tank 100 to release the negative pressure.

In addition, if the gap 18S is set small, the resistance of the air passage channel is increased so that the discharge amount of the VOC gas to outside the fuel tank 100 may be made small, whereby the vale body 22 may be floated up from the small-diameter portion 23B by further little pressure of the VOC gas; and thus, as mentioned before, the valve body 22 can block the connection between the second space S2 and the third space S3 so that the discharge amount of the VOC gas to outside the fuel tank 100 may be reduced.

Meanwhile, in the case that the valve body 22 is put on the small-diameter portion 23B under the state that the peripheral part of the valve body 22 contacts to the wall 19 thereby blocking the connection between the second space and the third space without forming the gap 18S between the valve body 22 and the slanted surface 19A of the shoulder cylinder portion 19, when the pressure inside the fuel tank 100 becomes negative by consumption of the fuel due to the drive of the engine 99, the state shown by FIG. 11 or FIG. 12 changes to the state shown by FIG. 15 regardless of the state that the fluid pressure of the fuel is acting or not acting to the valve body 22. In other words, the peripheral part of the valve body 22 is sucked toward the fuel tank 100 by the negative pressure; and as a result, the flexible peripheral part of the valve body 22 becomes to the state of hanging down by using the upper peripheral edge part of the valve-body-supporting member 23 as the pivot point. Because of this, the gap between the slanted surface 19A of the shoulder cylinder portion 19 and the valve body 22 is formed; and thus, an atmospheric air enters instantaneously into the fourth space S4 of the inner cap 13, the third space S3, and the second space S2 from outside the automobile 101 via the air passage channel 43 and the gap 40 between the outer cap 12 and the inner cap 13, and then the valve body 22 returns to the state that the negative pressure is not acting.

Meanwhile, the gap between the small diameter portion 23B of the valve-body-supporting member 23 and the tip of the rib 15 arranged on the surface 18B secures the space not to disturb the movement of hanging down of the valve body 22. When the outer diameter of the small diameter portion 23B of the valve-body-supporting member 23 is too long, amount of the hanging down of the valve body 22 becomes so small that the gap 18S between the valve body 22 and the slanted surface 19A cannot be secured.

Figure 16:
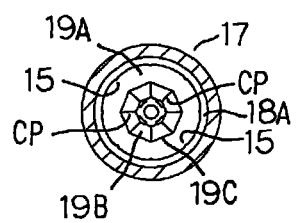
FIG. 16 is an X-X cross section view of the cylinder main body that forms a space having a shape of a truncated pyramid in the shoulder cylinder portion.

In the embodiment mentioned above, the third space S3 having a shape of almost a circular truncated cone is formed in the shoulder cylinder portion 19; but, a shape of a truncated pyramid, for example, a truncated, eight-sided pyramid, as shown in FIG. 16, and further, a hemispherical shape may be used. In the case of using a shape of a truncated pyramid formed with an upper plane, a lower plane, and a plurality of side planes, when the pressure inside the fuel tank 100 is increased to, such as for example, 3 kPa or higher to cause insertion of the central part of the valve body 22 into the third space S3 thereby significantly deforming the valve body 22, not only the connection between the second space S2 and the third space S3 becomes open via a space of the concave portion not contacted to the pivot point 19C of the valve body 22 but also the connection between the second space S2 and the third space S3 becomes open via the gap formed between the valve body 22 and eight of the corner CP including the oblique lines to form the side planes thereof; and as a result, an excessive pressure (including the VOC gas) inside the fuel tank 100 is released even more instantaneously to outside the fuel tank 100 thereby bringing the pressure inside the fuel tank 100 to lower than the pressure prescribed for the deformation strength, so that the connection between the second space S2 and the third space S3 can be secured, thereby functioning as a safety valve.

In addition, as shown in the above embodiment, when passage resistance upon connecting between outside and inside the fuel tank 100 is increased by arranging a partition and the like in the foregoing air passage channel connecting therebetween or by changing the cross section area of this air passage channel, change of the pressure and the like caused by temperature increase or wave motion of entering to the filler cap 10 from the fuel tank 100 due to vibration of the automobile 101 can be minimized; and thus, effects of the wave motion from the fuel tank 100 and change of the pressure and the like acting onto the valve body 22 can be suppressed to the smallest degree, so that deformation action and resuming action of the valve body 22 can be stabilized.

In the valve mechanism portion of the present invention, the fuel tank 100 is open to an atmosphere when the pressure inside the fuel tank 100 becomes equal to or higher than the pressure prescribed for the deformation strength of the valve body 22, and for the rest of the time, the valve body 22 shuts down the connection between the second space S2 and the third space S3 (this is connected to an atmosphere) by pressure of the VOC gas evaporated by outside temperature; and as a result, the harmful VOC gas is not discharged to outside the fuel tank 100 until the pressure therein reaches a deformation strength prescribed to the valve body 22, thereby realizing not only improvement of the fuel consumption of the automobile 101 but also prevention of the environmental pollution.

When the outside temperature continues to be decreased, generation of the VOC gas is suppressed without increasing the inner pressure of the fuel tank 100; and when the outside temperature ceases to be decreased, evaporation of the fuel starts thereby causing increase of the inner pressure of the fuel tank 100. When the inner pressure reaches, such as for example, 0.1 kPa or higher, the valve body 22, which is thin and light, floats above the valve-body- supporting member 23 by the fluid pressure ejected upward through the air passage channel 24 and the air passage channel 25 and then contacts to the slanted surface 19A; and as a result, the connection between the second space S2 and the third space S3 is shut down. Until the inner pressure does not reach the pressure of a deformation strength prescribed to the valve body 22, the foregoing shutting down continues; and as a result, the VOC gas is not discharged to outside the fuel tank 100. When the pressure becomes negative by consumption of the fuel in the fuel tank 100, the peripheral part of the valve body 22 hangs down toward the fuel tank 100 by using the upper peripheral edge part of the small diameter portion 23B of the valve-body-supporting member 23 as the pivot point, thereby enlarging the gap 18S (this plays a role as an air passage channel) between the slanted surface 19A and the valve body 22 to connect between the second space S2 and the third space S3; and as a result, an atmospheric air is introduced into the fuel tank 100, and thus, the foregoing valve mechanism portion functions as a one-way valve to bring inside the fuel tank 100 to the state of an atmospheric pressure.

Consequently, when the pressure inside the fuel tank 100 is negative, the second space S2 and the third space S3 are connected, and for the rest of the time, the valve body 22 always shuts down the connection between the second space S2 and the third space S3 by pressure of the VOC gas evaporated by outside temperature thereby preventing the VOC gas from being discharged to outside the fuel tank 100; and thus, the foregoing valve mechanism portion not only can improve the fuel consumption but also can prevent the environmental pollution from occurring in the automobile 101.

When a fluid pressure above the deformation strength prescribed to the valve body 22 acts to this valve body 22, the central part of the valve body 22 moves further up and enters into the third space S3 to be deformed so as to shorten the outer diameter thereof, whereby the position contacted to the pivot point 19C of the valve body 22 moves toward an outside position in this valve body; and as a consequence, wrinkles are formed by folding thereof in proportion to this movement, thereby forming the air passage channel on the pivot point 19C and releasing an excessive pressure to outside the fuel tank 100, so that the valve mechanism portion functions as a safety valve.

Meanwhile, in the case that a conventional filler cap was attached, for example, to a plate compacter for road construction, because of violent bouncing from side to side and up and down, there has been a danger that the fuel might be spilled out from the filler opening of this filler cap immediately after start of driving of the engine thereof. However, according to the filler cap of the present invention, even when the machine was driven with the tilting angle of about 30 degrees under the condition that the fuel tank was filled up with the fuel, the machine could be continuously driven under the condition of an atmospheric pressure inside the fuel tank without spilling the fuel to outside the fuel tank and without any problem in driving of the engine thereof. In addition, even when the pressure inside the fuel tank became negative because of consumption of the fuel by driving of the engine thereof, the air passage channel was opened instantaneously by the valve body, whereby introducing an atmospheric air into the fuel tank, and thus bringing the atmospheric pressure therein and causing no problems in driving. When the pressure inside the fuel tank becomes an atmospheric pressure, the valve body made of an elastic material reverts because of its elasticity; and when the negative pressure is released, the fuel starts to evaporate, thereby forcing the valve body to the wall that is slanted upward to connect between the wall to form the second space and the wall to form the third space of the cylinder main body; and further, when the pressure above a deformation strength prescribed to the valve body acts to this valve body, the central part of the valve body is raised so as to enter into the third space with deforming to shorten the outer diameter thereof, whereby moving the position contacted to a lower end of the wall (the pivot point), which forms the third space of the valve body, toward an outside position in this valve body; and consequently, wrinkles are formed by folding thereof in proportion to this movement, thereby forming the air passage channel; and as a result, an excessive inner pressure in the fuel tank is released to outside the fuel tank, so that the valve mechanism portion functions as a one-way valve or a safety valve that brings the pressure inside the fuel tank to lower than the pressure of the deformation strength prescribed to the valve body and realizes the function as a pressure regulation valve.

Figure 20:
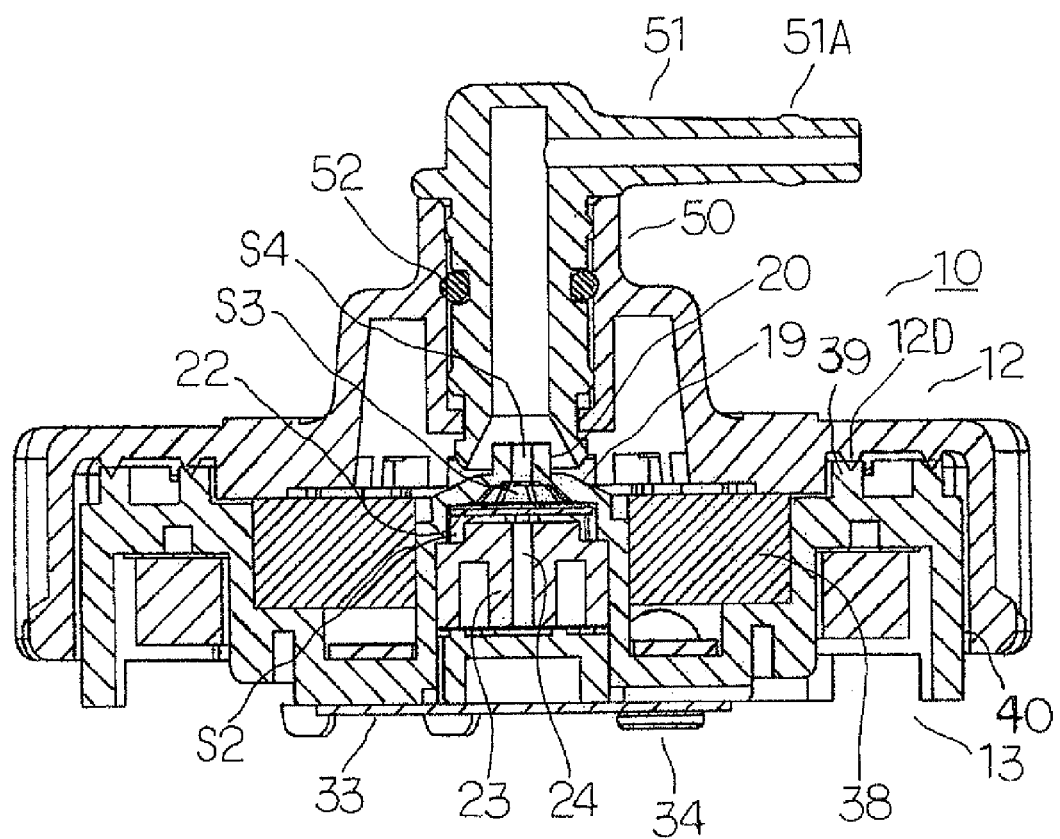
FIG. 20 is a vertical cross section view of the filler cap of another embodiment.

Meanwhile, in the embodiments described above, when the fuel inside the fuel tank 100 is evaporated to generate the VOC gas thereby increasing the pressure inside the fuel tank 100 to the pressure prescribed for the deformation strength of the valve body 22 or higher, the valve body 22 is deformed so as to connect the second space S2 to the third space S3 thereby discharging the excessive pressure and the VOC gas through the filler cap 10 to outside the fuel tank 100, namely outside the automobile 101; but the present invention is not limited to the filler cap 10 shown by the above-mentioned embodiments of the present invention but may also be according to the embodiment shown by FIG. 20, and this will be explained hereinafter.

That is, as shown by the dotted line in FIG. 1, the filler cap 10 is connected to the canister 96; and as mentioned before, when the VOC gas is generated thereby increasing the pressure inside the fuel tank 100 to the pressure prescribed for the deformation strength of the valve body 22 or higher, the valve body 22 is deformed so as to connect the second space S2 to the third space S3 thereby discharging the excessive pressure and the VOC gas through the filler cap 10 to outside the fuel tank 100, whereby this discharged VOC gas is adsorbed to an adsorbing member (activated carbon) arranged in the canister 96, and is also discharged to the evaporator 95 to be burnt in the engine 99. With this measure, the VOC gas is not discharged to an atmosphere outside the automobile 101; and thus, an environmental pollution may be prevented further and fuel consumption may be improved.

Hereinafter explanation will be made specifically. In the central part on the upper plane of the outer cap 12 is formed a pipe-fitting portion 50 which has a hollow cylinder form extended upward and is connected to the fourth space S4. To this pipe-fitting portion 50 is fitted one end of a hollow pipe 51 which is flexed to almost a right angle with a side view of the "L" character. That is, a diameter of the one end of the pipe 51 is formed slightly smaller than the inner diameter of the pipe-fitting portion 50; and by inserting the one end of this pipe 51 into the pipe-fitting portion 50, the pipe 51 is fitted to the pipe-fitting portion 50. On a central inner surface of the pipe-fitting portion 50 is formed a groove for fitting O-ring 52, and at the same time on an outer surface of the pipe 51 at the position facing to the groove of the pipe-fitting portion 50 is formed a groove for fitting the O-ring 52; into these grooves is fitted the O-ring 52 formed of an elastic silicone rubber. Owing to this measure, the gap between the pipe-fitting portion 50 and the pipe 51 is sealed.

Meanwhile, the small-diameter cylinder portion 20 of the cylinder main body 16 is inserted into the pipe 51 having an inner space so as to form a space with an inner wall of this pipe 51, and the pipe 51 is fitted to the pipe-fitting portion 50 by the intervention of the O-ring 52; with this fitting, the pipe 51 is configured so as to be rotationally movable.

Then, the pipe 51 is arranged with a release-prevention portion 51A to prevent release of a bendable hose (not shown) connected to the other end of the pipe 51 (opposite to the part fitted to the pipe-fitting portion 50). The one end of the hose is connected to the other end of the pipe 51, and the other end of this hose is connected to the canister 96; with this measure, the outer cap 12 is connected, via the canister 96, to the evaporator 95 that is connected to an atmosphere (outside the automobile 101). However, the groove 41 is not formed at each of the convex portion 39 on a upper plane of the inner cap 13, whereby each of the melt-adhesive rib 12D is formed continuously without the distance IN; and each of the melt-adhesive rib 12D and each of the convex portion 39 are melt-fixed by a ultrasonic wave so as to always block the connection between the fourth space S4 and the gap 40; and as a result, the configuration is made so as not to connect inside the fuel tank 100 to outside the automobile 101 via the gap 40.

Consequently, as mentioned before, when the pressure inside the fuel tank 100 becomes the pressure higher than the deformation strength prescribed for the valve body 22, the VOC gas discharged to outside the fuel tank 100 from the filler cap 10 via the pipe 51 and the hose is adsorbed to the adsorbent member arranged in the canister 96, and is also discharged from this canister 96 to the evaporator 95 to be burnt in the engine 99. With this measure, the VOC gas is not discharged to an atmosphere outside the automobile 101; and thus, an environmental pollution may be prevented further and fuel consumption may be improved.

Further, as mentioned before, when the pressure becomes negative by consumption of the fuel in the fuel tank 100, the peripheral part of the valve body 22 hangs down by using the upper peripheral edge part of the small diameter portion 23B of the valve-body-supporting member 23 as the pivot point, thereby enlarging the gap 18S between the slanted surface 19A and the valve body 22 so as to connect between the second space S2 and the third space S3; and as a result, an atmospheric air is introduced into the fuel tank 100 from outside the automobile 101 via the canister 96 and the evaporator 95 connected to an atmosphere; and thus, the valve mechanism portion functions as a one-way valve to bring inside the fuel tank 100 to the state of an atmospheric pressure.

Figure 19:
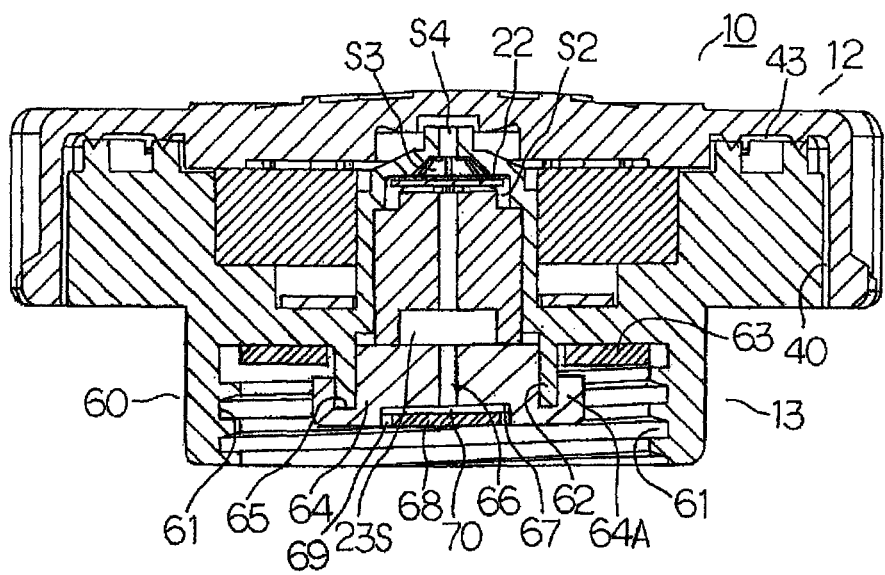
FIG. 19 is a vertical cross section view of the filler cap attached to the filler opening by a screw-threaded engagement.

Meanwhile, the structure that the VOC gas discharged to outside the fuel tank 100 from the fuel tank 100 is adsorbed to the adsorbent member (activated carbon) arranged in the canister 96, and is also discharged to the evaporator 95 from the canister 96 to be burnt in the engine 99, as described above, may also be applied to the filler cap 10 having the structure that the filler cap is attached to the filler opening 98 by a screw-threaded engagement as shown in FIG. 19.

Further, similar to the filler cap 10 according to the second invention, if the configuration is made such that, when the valve body 22 is put on the small-diameter portion 23B under the state that the peripheral edge part of the valve body 22 contacts to the slanted surface 19A that is slanted upward so as to connect the surface 18B forming the second space S2 of the cylinder main body 16 to the slanted surface 19B forming the third space S3, the central part thereof may face to the third space S3, the pressure of the VOC gas increases gradually by evaporation of the fuel in the fuel tank 100 with increase of surface temperature of the fuel tank 100; but the connection between the second space S2 and the third space S3 is under the blocked state even if the pressure thereof is small; and thus, if the pressure of the VOC gas is developed, the VOC gas is not discharged outside the fuel tank 100. Accordingly, with increase of the pressure inside the fuel tank 100, the second space S2 is filled by the pressure ejected from the air passage channel 24 of the valve-supporting member 23 and the air passage channel 25 between the upper plane of the small-diameter portion 23B and the valve body 22, whereby the central part of the valve body 22 is pushed upward; as a result, the state that the upper peripheral edge part of the valve body 22 is contacted to the slanted surface 19A by the line contact is shifted to the plane contact, and thus, the VOC gas is not discharged outside the fuel tank 100 until the pressure reaches the pressure for a deformation strength prescribed to the valve body 22.

Therefore, in the filler cap 10 according to the second invention, the valve body 22 is put on the small-diameter portion 23B without having the gap 18S to the slanted surface 19A; and thus, unlike the filler cap 10 according to the first invention wherein the valve body is put on the small-diameter portion 23B while the peripheral edge part of the valve body 22 has the gap 18S with the slanted surface 19A, the VOC gas is not discharged outside the fuel tank 100 until the valve body 22 moves up and contacts to the slanted surface 19A thereby blocking the connection between the second space S2 and the third space S3, but only when the pressure reaches the pressure for a deformation strength prescribed to the valve body 22 or higher, the excessive pressure inside the fuel tank 100 is released outside the fuel tank 100 to bring down the pressure inside the fuel tank 100 lower than the pressure for the deformation strength.

In the filler cap 10 according to the second invention, when the pressure inside the fuel tank 100 becomes negative by consumption of the fuel, the peripheral part of the valve body 22 hangs down toward the fuel tank 100 by using the upper peripheral edge part of the small diameter portion 23B of the valve-body-supporting member 23 as the pivot point, thereby forming the gap between the slanted surface 19A and the valve body 22 to connect between the second space S2 and the third space S3; and as a result, an atmospheric air is introduced into the fuel tank 100 to bring inside the fuel tank 100 to the state of an atmospheric pressure, and thus, the negative pressure is released. When this negative pressure is released, the upper peripheral edge part of the valve body 22 contacts to the slanted surface 19A by the line contact thereby blocking the connection between the second space S2 and the third space S3. Meanwhile, if the negative pressure inside the fuel tank 100 is not released, the negative pressure is released by repeating introduction of an atmospheric air and blocking of the connection between the second space S2 and the third space S3, as mentioned above. In the case that the negative pressure continues by continuous driving of the engine 99, hanging down of the peripheral part of the valve body 22 toward the fuel tank 100 continues; and when the negative pressure ends, the valve body 22 resumes its original form whereby the upper peripheral edge part of the valve body 22 contacts to the slanted surface 19A by the line contact, and thus, the connection between the second space S2 and the third space S3 is blocked.

Meanwhile, if a heat acting on the fuel tank surface from direct sunlight, outer temperature, and heat sources such as the engine can be shielded, increase of the pressure inside the fuel tank can be suppressed; and thus, by combing the fuel cap 10 of the present invention with the fuel tank having suppressed increase of the inner pressure accomplished by such measures as coating or plating the fuel tank surface, applying insulation thereto, shifting the coating color of the fuel tank from a black color that absorbs a large heat to a white color that absorbs a small heat, and arranging a sun-screen cover thereto, the discharge of the VOC gas to outside the fuel tank may be further suppressed, thereby enabling to improve the fuel consumption, to render the canister and the like unnecessary, and to prevent an environmental pollution cheaply.

The embodiment of the present invention has been explained as above; and based on the above explanation, those skilled in the art may use various alternatives, amendments, and variations thereof; and the present invention includes various alternatives, amendments, and variations mentioned above in the range not deviating from the scope described therein.

What is claimed is:

1. A filler cap for a fuel tank, wherein the filler cap is attached to a filler opening of a fuel tank, and arranged with an air passage channel to connect between inside and outside the fuel tank in a cap main body comprised of an outer cap and an inner cap and with a valve mechanism portion in this air passage channel; wherein, the valve mechanism portion comprises:

a cylinder main body arranged with a first space of a columnar shape arranged almost at a center position of an inner plane of the inner cap so as to be connected to inside the fuel tank, a second space of a columnar shape having a smaller diameter than the first space and arranged so as to be connected to the first space, and a third space arranged so as to be connected to this second space and at the same time to outside the fuel tank, a valve-body-supporting member arranged in the first space with a large diameter portion so as to form a connection channel to inside the fuel tank and with a small diameter portion having a smaller outer diameter than the large diameter portion and arranged on an upper plane of the small diameter portion with an air passage channel connected to this connection channel, and a valve body formed of a non-air-permeable, elastic material having a thin form with elasticity and flexibility, and also having a circular plain view with a larger diameter than the small diameter portion of the valve-body-supporting member, wherein the valve body is put on the small diameter portion with a peripheral edge part of the valve body being slightly apart from a first surface that is slanted upward so as to connect between a second surface to form the second space of the cylinder main body and a third surface to form the third space, and at the same time, a central part of the valve body under the state of putting on in a manner as mentioned above is facing to the third space; wherein, when a pressure inside the fuel tank is increased by a vaporized gas evaporated from a fuel in the fuel tank, the valve body moves upward by the vaporized gas via the air passage channel and the connection channel between inside the fuel tank and the valve-body-supporting member so that a peripheral part of the valve body may contact to the first surface of the cylinder main body thereby shutting down the connection between the second space and the third space, when the pressure inside the fuel tank is further increased above a pressure for a deformation strength prescribed to the valve body, a central part of the valve body moves upward further and enters into the third space thereby causing deformation so as to shorten the outer diameter of the valve body to form wrinkles; and as a result, in the peripheral part of the valve body are formed a portion contacting to a lower end of the third surface to form the third space of the cylinder main body and a concave portion not contacting thereto, and consequently, the second space and the third space are connected via a space of this concave portion to release an excessive pressure to outside the fuel tank thereby bringing the pressure inside the fuel tank to lower than the pressure for the deformation strength, and when the pressure inside the fuel tank becomes negative by consumption of the fuel inside the fuel tank under the state that a fluid pressure of the fuel is acting to the valve body, the peripheral part of the valve body is sucked toward the fuel tank by this negative pressure whereby the peripheral part of the valve body hangs down by using an upper peripheral edge part of the small diameter portion of the valve-body-supporting member as a pivot point thereby enlarging a gap between the first surface of the cylinder main body and the valve body so as to connect between the second space and the third space thereby introducing an atmospheric air into the fuel tank so as to bring the state of an atmospheric pressure;

whereby functioning as a safety valve as well as a one-way valve.

2. A filler cap for a fuel tank, wherein the filler cap is attached to a filler opening of a fuel tank, and arranged with an air passage channel to connect between inside and outside the fuel tank in a cap main body comprised of an outer cap and an inner cap and with a valve mechanism portion in this air passage channel; wherein, the valve mechanism portion comprises:

a cylinder main body arranged with a first space of a columnar shape arranged almost at a center position of an inner plane of the inner cap so as to be connected to inside the fuel tank, a second space of a columnar shape having a smaller diameter than the first space and arranged so as to be connected to the first space, and a third space arranged so as to be connected to this second space and at the same time to outside the fuel tank, a valve-body-supporting member arranged in the first space with a large diameter portion so as to form a connection channel to inside the fuel tank and with a small diameter portion having a smaller outer diameter than the large diameter portion and arranged on an upper plane of the small diameter portion with an air passage channel connected to this connection channel, and a valve body formed of a non-air-permeable, elastic material having a thin form with elasticity and flexibility, and also having a circular plain view with a larger diameter than the small diameter portion of the valve-body-supporting member, wherein the valve body is put on the small diameter portion under the state that a peripheral edge part of the valve body is contacted to a first surface that is slanted upward so as to connect between a second surface to form the second space of the cylinder main body and a third surface to form the third space thereby blocking the connection between the second space and the third space, and at the same time, a central part of the valve body under the state of putting on in a manner as mentioned above is facing to the third space; wherein, when a pressure inside the fuel tank is increased above a pressure for a deformation strength prescribed to the valve body, a central part of the valve body moves upward and enters into the third space thereby causing deformation so as to shorten the outer diameter of the valve body to form wrinkles; and as a result, in a peripheral part of the valve body are formed a portion contacting to a lower end of the third surface to form the third space of the cylinder main body and a concave portion not contacting thereto, and consequently, the second space and the third space are connected via a space of this concave portion to release an excessive pressure to outside the fuel tank thereby bringing the pressure inside the fuel tank to lower than the pressure for the deformation strength, and when the pressure inside the fuel tank becomes negative by consumption of the fuel inside the fuel tank, the peripheral part of the valve body is sucked toward the fuel tank by this negative pressure whereby the peripheral part of the valve body hangs down by using an upper peripheral edge part of the small diameter portion of the valve-body-supporting member as a pivot point thereby forming a gap between the first surface of the cylinder main body and the valve body so as to connect between the second space and the third space thereby introducing an atmospheric air into the fuel tank so as to bring the state of an atmospheric pressure;

whereby functioning as a safety valve as well as a one-way valve.

* * * * *

UNITED STATES PATENT AND TRADEMARK OFFICE
CERTIFICATE OF CORRECTION

PATENT NO. : 8,657,140 B2
APPLICATION NO. : 13/548686
DATED : February 25, 2014
INVENTOR(S) : Masashi Iwami et al.

It is certified that error appears in the above-identified patent and that said Letters Patent is hereby corrected as shown below:

In the Specification

Col. 14, line 55, change "19B" to --19B)--.

Signed and Sealed this
Twenty-fourth Day of June, 2014

Michelle K. Lee
*Deputy Director of the United States Patent and Trademark Office*